United States Patent [19]

Roper

[11] Patent Number: 5,865,054
[45] Date of Patent: Feb. 2, 1999

[54] APPARATUS AND METHOD FOR FORMING A TUBULAR FRAME MEMBER

[75] Inventor: Ralph E. Roper, Indianapolis, Ind.

[73] Assignee: Aquaform Inc., Auburn Hills, Mich.

[21] Appl. No.: 463,808

[22] Filed: Jun. 5, 1995

Related U.S. Application Data

[62] Division of Ser. No. 263,325, Jun. 21, 1994, Pat. No. 5,499,520, which is a division of Ser. No. 77,616, Aug. 23, 1993, Pat. No. 5,353,618, which is a division of Ser. No. 837,081, Feb. 12, 1992, Pat. No. 5,239,852, which is a continuation of Ser. No. 482,782, Feb. 21, 1990, abandoned, which is a continuation of Ser. No. 398,272, Aug. 24, 1989, abandoned.

[51] Int. Cl.$^6$ .............................. B21D 26/02; B21D 15/03
[52] U.S. Cl. .................................... 72/58; 72/62; 72/367; 29/421.1
[58] Field of Search .................................. 72/57, 58, 59, 72/61, 367, 369; 29/421.1

[56] References Cited

U.S. PATENT DOCUMENTS

| Re. 33,990 | 7/1992 | Cudini . |
|---|---|---|
| 169,392 | 11/1875 | Wicks . |
| 203,842 | 5/1878 | Leland . |
| 383,081 | 5/1888 | Swift . |
| 453,410 | 6/1891 | Langerfeld . |

(List continued on next page.)

FOREIGN PATENT DOCUMENTS

| 1309239 | 10/1992 | Canada . |
|---|---|---|
| 0 268 026 | 5/1988 | European Pat. Off. . |
| 0 414 545 | 2/1991 | European Pat. Off. . |
| 0 374 317 | 4/1906 | France . |
| 1 805 554 | 3/1970 | Germany . |
| 2 450 624 | 5/1975 | Germany . |
| 2 345 985 | 9/1977 | Germany . |
| 4 103 083 | 5/1992 | Germany . |
| 45-001344 | 1/1970 | Japan . |
| 50-035026 | 4/1975 | Japan . |
| 55-10328 | 1/1980 | Japan . |
| 55-77934 | 6/1980 | Japan . |
| 56-154228 | 11/1981 | Japan . |
| 57-002730 | 1/1982 | Japan . |
| 58-003738 | 1/1983 | Japan . |
| 59-130633 | 7/1984 | Japan . |
| 60-015027 | 1/1985 | Japan . |
| 60-082229 | 5/1985 | Japan . |
| 61-238423 | 10/1986 | Japan . |
| 53-027490 | 12/1993 | Japan . |
| 0 549 199 | 3/1977 | Russian Federation . |
| 0 590 038 | 2/1978 | Russian Federation . |
| 0 619 254 | 7/1978 | Russian Federation . |
| 1 176 994 | 9/1985 | Russian Federation . |
| 1 263 392 | 10/1985 | Russian Federation . |
| 1 349 820 | 11/1987 | Russian Federation . |
| 0 385 146 | 3/1965 | Switzerland . |
| 0 519 593 | 4/1940 | United Kingdom . |
| 0 523 948 | 7/1940 | United Kingdom . |
| 2 162 446 | 2/1986 | United Kingdom . |

*Primary Examiner*—David Jones
*Attorney, Agent, or Firm*—Arnold White & Durkee

[57] ABSTRACT

An apparatus for forming a frame member for an automobile from a tube blank applies internal hydraulic pressure to the blank, tangent bends and preforms the internally pressurized blank into a preformed tube having a desired horizontal profile configuration, then forms the preformed tube into a finally formed frame member having a desired vertical profile configuration and a desired, varying cross-sectional configuration by placing the preformed tube in a stuffing ledge apparatus having a lower die with an upwardly facing ledge and vertically extending, punch engaging surfaces and a punch having a downwardly facing ledge and vertically extending, die engaging surfaces, internally pressurizing the tube, and then ramming the punch downwardly to form the tube into the finally formed frame member, the ledges and vertically extending surfaces substantially completely enclosing a portion of the tube before and while the punch and die come together to form the tube into the finally formed frame member. The forming components in each apparatus are submerged in an aqueous bath, allowing the blank and tube to automatically fill themselves, thereby facilitating sealing and pressurizing of the tube.

14 Claims, 14 Drawing Sheets

U.S. PATENT DOCUMENTS

| | | |
|---|---|---|
| 567,518 | 9/1896 | Simmons . |
| 588,804 | 8/1897 | Parish . |
| 618,353 | 1/1899 | Huber . |
| 693,172 | 2/1902 | Sneddon . |
| 731,124 | 6/1903 | Park . |
| 906,911 | 12/1908 | McCullough . |
| 1,180,738 | 4/1916 | Rehbein . |
| 1,180,739 | 4/1916 | Rehbein . |
| 1,210,629 | 1/1917 | Foster . |
| 1,389,348 | 8/1921 | Gulick . |
| 1,448,457 | 3/1923 | Liddell . |
| 1,542,983 | 6/1925 | Bergmann, Jr. . |
| 1,625,914 | 4/1927 | Seibt . |
| 1,683,123 | 9/1928 | Bergmann, Jr. . |
| 1,879,009 | 9/1932 | Anthony . |
| 1,884,589 | 10/1932 | Davies . |
| 1,943,560 | 1/1934 | Squires . |
| 2,047,296 | 7/1936 | Squires . |
| 2,203,868 | 6/1940 | Gray et al. . |
| 2,292,462 | 8/1942 | Milford . |
| 2,344,743 | 3/1944 | Smith, Jr. . |
| 2,649,067 | 8/1953 | Kranenberg . |
| 2,652,121 | 9/1953 | Kearns, Jr. et al. . |
| 2,707,820 | 5/1955 | Reynolds . |
| 2,713,314 | 7/1955 | Leuthesser, Jr. et al. . |
| 2,726,973 | 12/1955 | Corral . |
| 2,734,473 | 2/1956 | Reynolds . |
| 2,748,455 | 6/1956 | Draper et al. . |
| 2,771,851 | 11/1956 | McGregor . |
| 2,777,500 | 1/1957 | Ekholm et al. ............................ 72/57 |
| 2,821,156 | 1/1958 | Lyon . |
| 2,841,865 | 7/1958 | Jackson . |
| 2,892,254 | 6/1959 | Garvin . |
| 2,902,962 | 9/1959 | Garvin . |
| 3,020,633 | 2/1962 | Heuer . |
| 3,072,085 | 1/1963 | Landis . |
| 3,077,170 | 2/1963 | Parlasca . |
| 3,105,537 | 10/1963 | Foster . |
| 3,136,053 | 6/1964 | Powell . |
| 3,151,590 | 10/1964 | Garvin . |
| 3,160,130 | 12/1964 | Pesak . |
| 3,208,255 | 9/1965 | Burk . |
| 3,220,098 | 11/1965 | Arbogast . |
| 3,222,910 | 12/1965 | Roper . |
| 3,241,348 | 3/1966 | Roper . |
| 3,247,581 | 4/1966 | Pellizari . |
| 3,254,521 | 6/1966 | Roper . |
| 3,264,730 | 8/1966 | Roper . |
| 3,285,045 | 11/1966 | Berg . |
| 3,286,496 | 11/1966 | Burk . |
| 3,286,570 | 11/1966 | Roper . |
| 3,299,689 | 1/1967 | Dolney et al. . |
| 3,303,680 | 2/1967 | Thielsch . |
| 3,314,270 | 4/1967 | Dolney . |
| 3,328,996 | 7/1967 | Pin et al. . |
| 3,373,585 | 3/1968 | Reynolds . |
| 3,392,561 | 7/1968 | Feather . |
| 3,396,561 | 8/1968 | Day . |
| 3,440,711 | 4/1969 | Roper . |
| 3,443,413 | 5/1969 | Roper . |
| 3,487,668 | 1/1970 | Fuchs, Jr. . |
| 3,505,846 | 4/1970 | Smida . |
| 3,516,274 | 6/1970 | Graham et al. . |
| 3,530,272 | 9/1970 | Roper . |
| 3,535,901 | 10/1970 | Tominaga . |
| 3,550,491 | 12/1970 | Wingard . |
| 3,568,487 | 3/1971 | Riesener . |
| 3,585,828 | 6/1971 | Roper . |
| 3,596,485 | 8/1971 | Burk . |
| 3,613,423 | 10/1971 | Nakamura . |
| 3,623,347 | 11/1971 | Burk . |
| 3,646,653 | 3/1972 | Richard . |
| 3,650,140 | 3/1972 | Zmuda . |
| 3,654,785 | 4/1972 | Ueda et al. . |
| 3,664,172 | 5/1972 | Cvacho . |
| 3,686,910 | 8/1972 | Fuchs, Jr. . |
| 3,686,921 | 8/1972 | Roper . |
| 3,701,270 | 10/1972 | Matthews . |
| 3,715,902 | 2/1973 | Fuchs, Jr. . |
| 3,739,615 | 6/1973 | Tressel . |
| 3,751,956 | 8/1973 | Blanchi . |
| 3,763,681 | 10/1973 | Flintoft . |
| 3,768,288 | 10/1973 | Jury . |
| 3,769,824 | 11/1973 | Granzow . |
| 3,789,649 | 2/1974 | Clowes . |
| 3,808,860 | 5/1974 | Yamaguchi et al. . |
| 3,810,302 | 5/1974 | Broers et al. . |
| 3,813,751 | 6/1974 | Smida . |
| 3,863,706 | 2/1975 | Chandley et al. . |
| 3,890,819 | 6/1975 | DeLuca . |
| 3,900,064 | 8/1975 | Chandley et al. . |
| 3,914,969 | 10/1975 | Banks . |
| 3,934,440 | 1/1976 | Berg . |
| 3,934,441 | 1/1976 | Hamilton et al. . |
| 3,946,584 | 3/1976 | Yamasaki et al. . |
| 3,962,895 | 6/1976 | Rydell . |
| 3,974,675 | 8/1976 | Tominaga . |
| 4,051,704 | 10/1977 | Kimura . |
| 4,062,215 | 12/1977 | Roper . |
| 4,112,997 | 9/1978 | Chandley . |
| 4,125,937 | 11/1978 | Brown et al. . |
| 4,189,162 | 2/1980 | Rasmussen et al. . |
| 4,195,510 | 4/1980 | Juergens . |
| 4,211,102 | 7/1980 | Hurvitz . |
| 4,238,878 | 12/1980 | Stamm et al. . |
| 4,238,949 | 12/1980 | Roger . |
| 4,265,102 | 5/1981 | Shimakata et al. . |
| 4,295,357 | 10/1981 | Roper . |
| 4,314,468 | 2/1982 | Baril et al. . |
| 4,319,471 | 3/1982 | Benteler et al. . |
| 4,340,108 | 7/1982 | Chandley et al. . |
| 4,352,280 | 10/1982 | Ghosh . |
| 4,409,808 | 10/1983 | Festag et al. . |
| 4,419,876 | 12/1983 | Spacek et al. . |
| 4,432,222 | 2/1984 | Ujihara et al. . |
| 4,454,745 | 6/1984 | Cudini . |
| 4,472,955 | 9/1984 | Nakamura et al. . |
| 4,484,756 | 11/1984 | Takamiya et al. . |
| 4,485,653 | 12/1984 | Rasmussen . |
| 4,485,654 | 12/1984 | Rasmussen . |
| 4,485,658 | 12/1984 | Stewart et al. ............................ 72/149 |
| 4,502,309 | 3/1985 | Hamilton et al. . |
| 4,508,157 | 4/1985 | Belliveau et al. . |
| 4,532,976 | 8/1985 | Chandley . |
| 4,567,543 | 1/1986 | Miniet . |
| 4,567,743 | 2/1986 | Cudini . |
| 4,576,030 | 3/1986 | Roper . |
| 4,589,466 | 5/1986 | Chandley et al. . |
| 4,606,396 | 8/1986 | Chandley et al. . |
| 4,651,799 | 3/1987 | Chandley . |
| 4,662,204 | 5/1987 | Saegusa . |
| 4,689,979 | 9/1987 | Otsuka et al. . |
| 4,704,886 | 11/1987 | Evert et al. ............................... 72/57 |
| 4,730,474 | 3/1988 | Iwakura et al. . |
| 4,744,237 | 5/1988 | Cudini . |
| 4,748,837 | 6/1988 | Kurosawa et al. . |
| 4,759,111 | 7/1988 | Cudini . |
| 4,761,982 | 8/1988 | Snyder . |
| 4,763,506 | 8/1988 | Zeng . |
| 4,765,166 | 8/1988 | Bergman et al. . |
| 4,766,756 | 8/1988 | Shiue . |
| 4,788,843 | 12/1988 | Seaman et al. . |

| | | | | | |
|---|---|---|---|---|---|
| 4,803,878 | 2/1989 | Moroney . | 5,170,557 | 12/1992 | Rigsby . |
| 4,815,308 | 3/1989 | Moroney . | 5,203,190 | 4/1993 | Kramer et al. . |
| 4,827,747 | 5/1989 | Okada et al. . | 5,233,854 | 8/1993 | Bowman et al. . |
| 4,829,803 | 5/1989 | Cudini . | 5,233,856 | 8/1993 | Shimanovski et al. . |
| 4,833,903 | 5/1989 | De Smet . | 5,235,836 | 8/1993 | Klages et al. . |
| 4,840,053 | 6/1989 | Nakamura . | 5,239,852 | 8/1993 | Roper . |
| 4,951,491 | 8/1990 | Lorenz . | 5,275,031 | 1/1994 | Whiteside et al. . |
| 4,951,492 | 8/1990 | Vogt . | 5,279,142 | 1/1994 | Kaiser . |
| 4,961,455 | 10/1990 | Redemske et al. . | 5,321,964 | 6/1994 | Shimanovski et al. . |
| 4,989,482 | 2/1991 | Mason . | 5,333,775 | 8/1994 | Bruggermann et al. . |
| 5,007,265 | 4/1991 | Mahoney et al. . | 5,339,667 | 8/1994 | Shah et al. . |
| 5,042,561 | 8/1991 | Chandley . | 5,353,618 | 10/1994 | Roper et al. ............................. 72/58 |
| 5,069,271 | 12/1991 | Chandley et al. . | 5,363,544 | 11/1994 | Wells et al. . |
| 5,070,717 | 12/1991 | Boyd et al. . | 5,396,786 | 3/1995 | Bartholomew et al. . |
| 5,107,693 | 4/1992 | Olszewski et al. . | 5,435,163 | 7/1995 | Schäfer . |
| 5,113,924 | 5/1992 | Green et al. . | 5,481,892 | 1/1996 | Roper et al. . |
| 5,157,969 | 10/1992 | Roper . | 5,499,520 | 3/1996 | Roper ........................................ 72/58 |

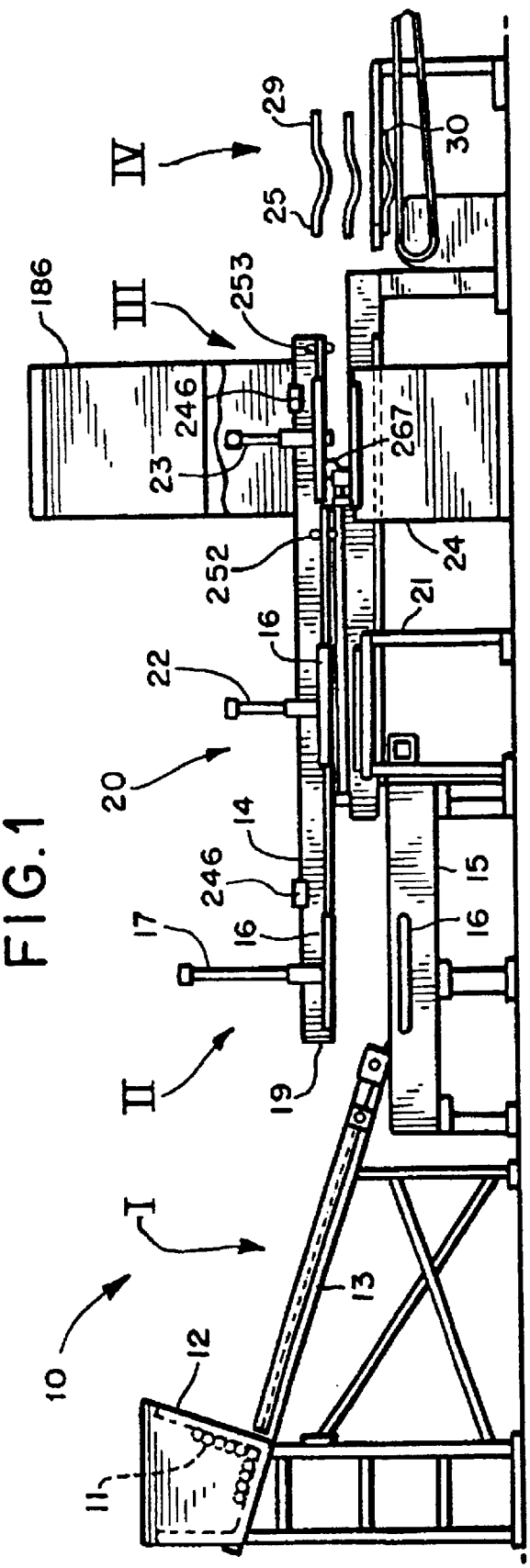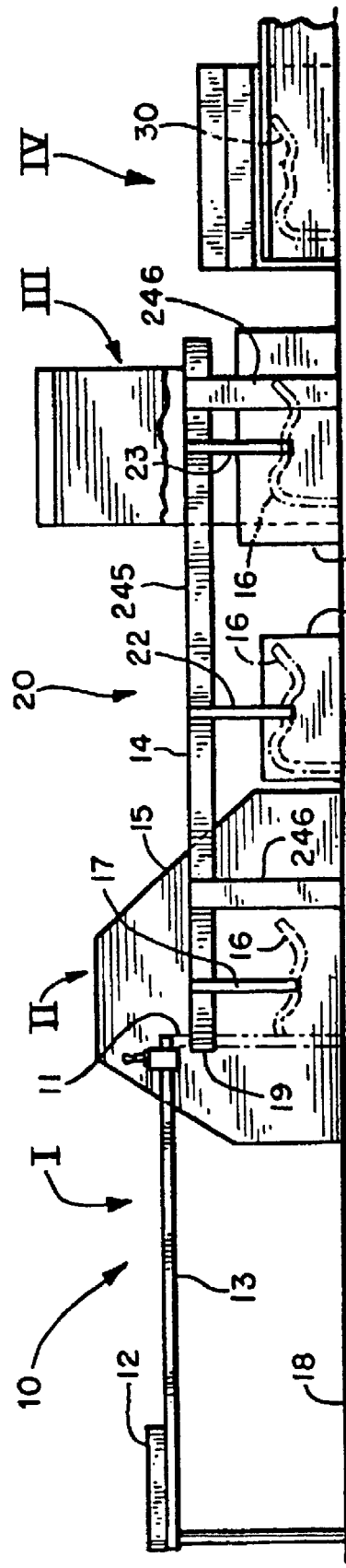

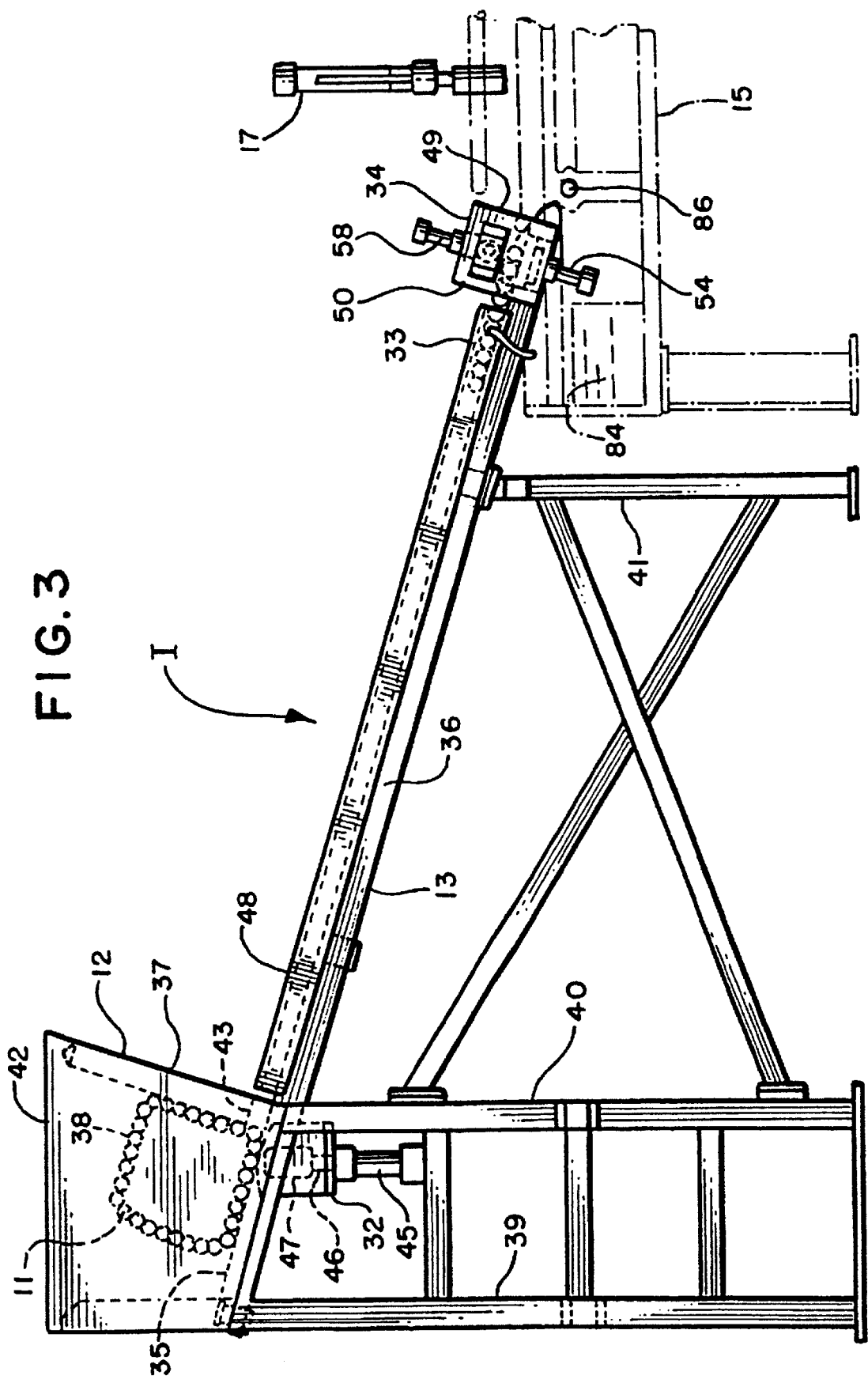

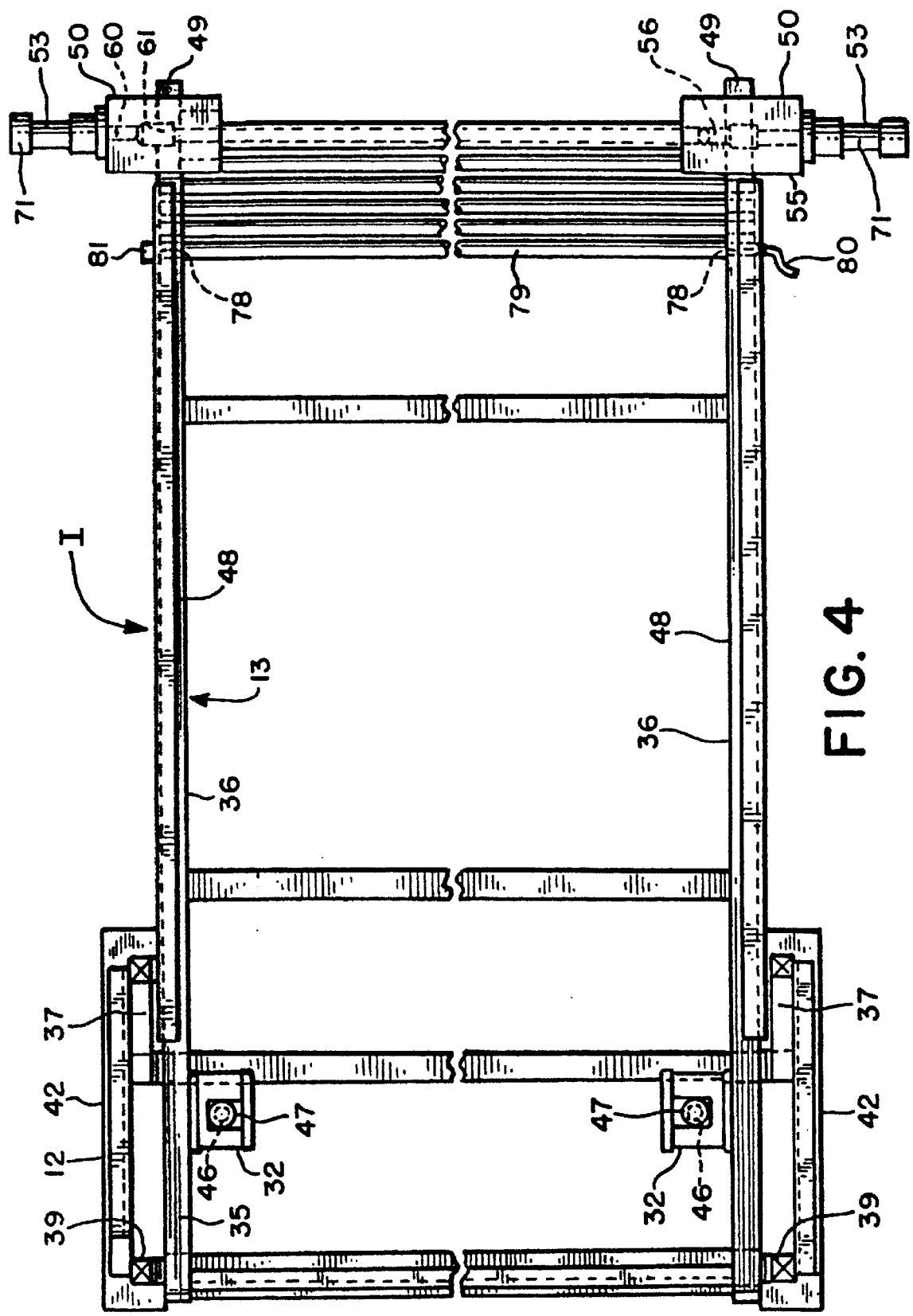

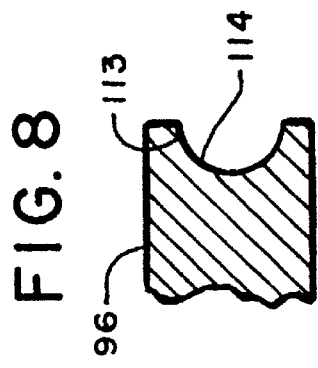
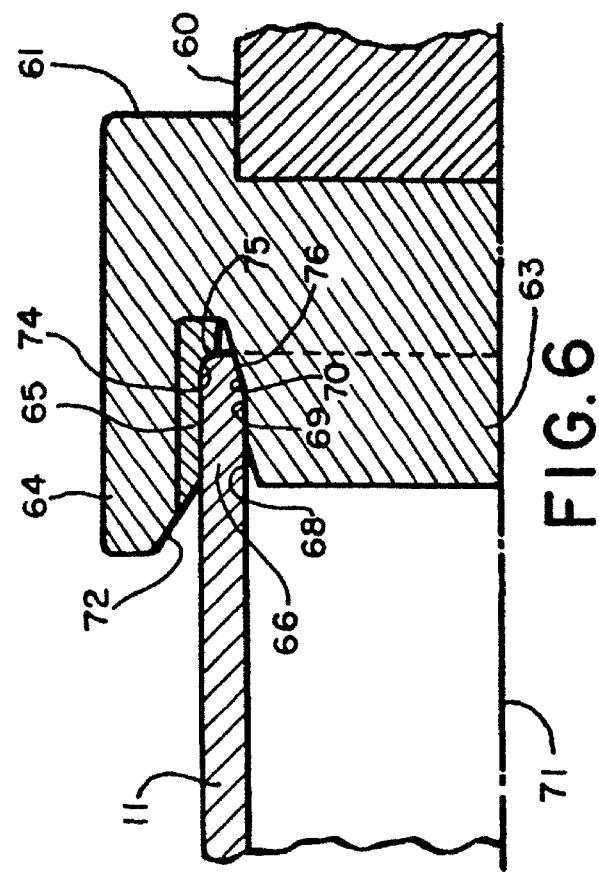
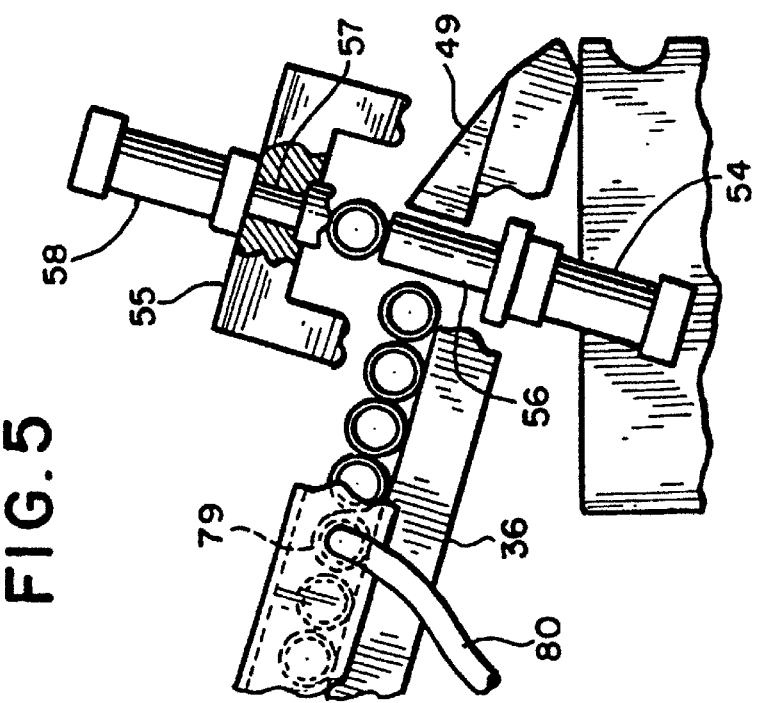

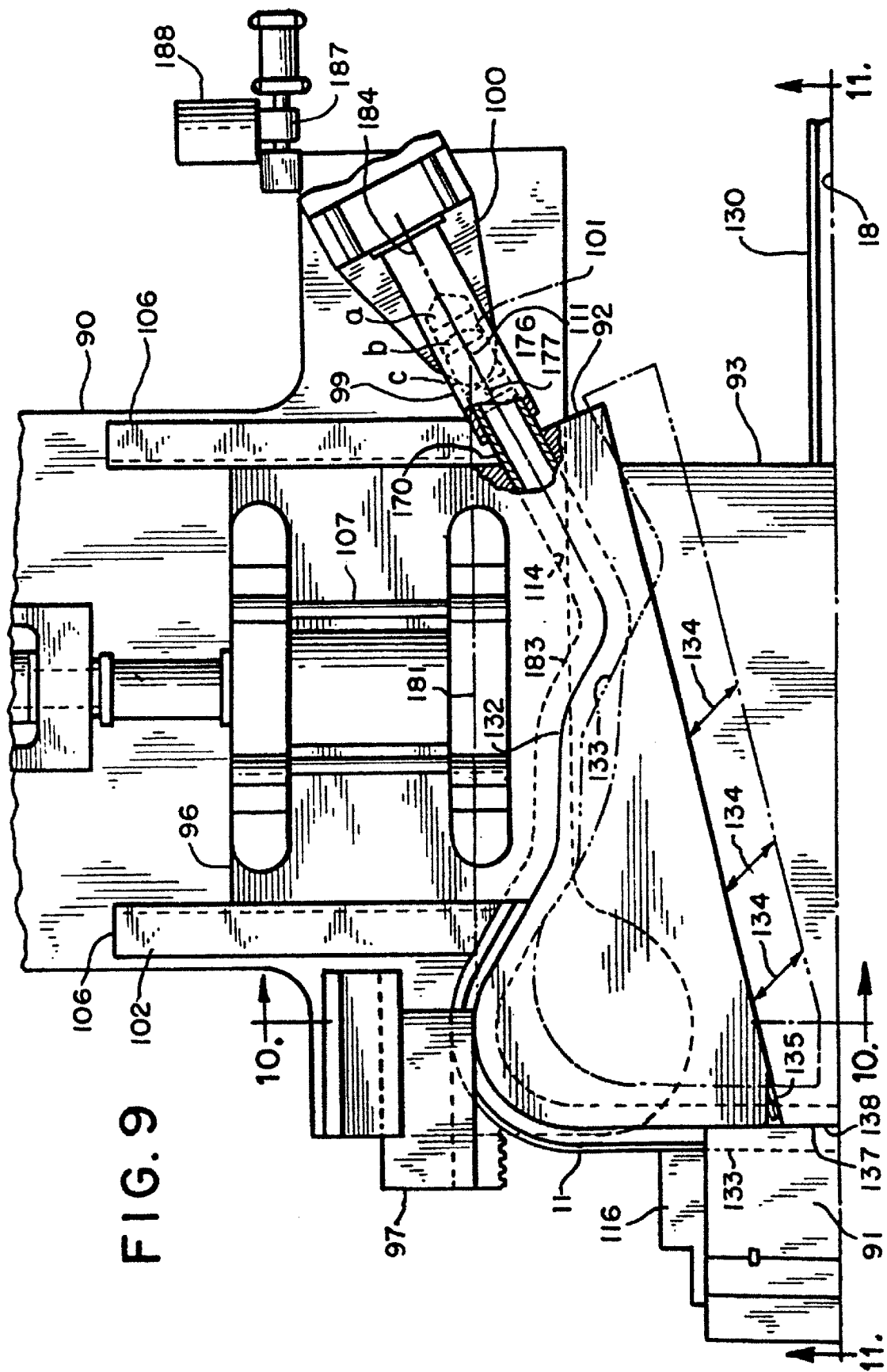

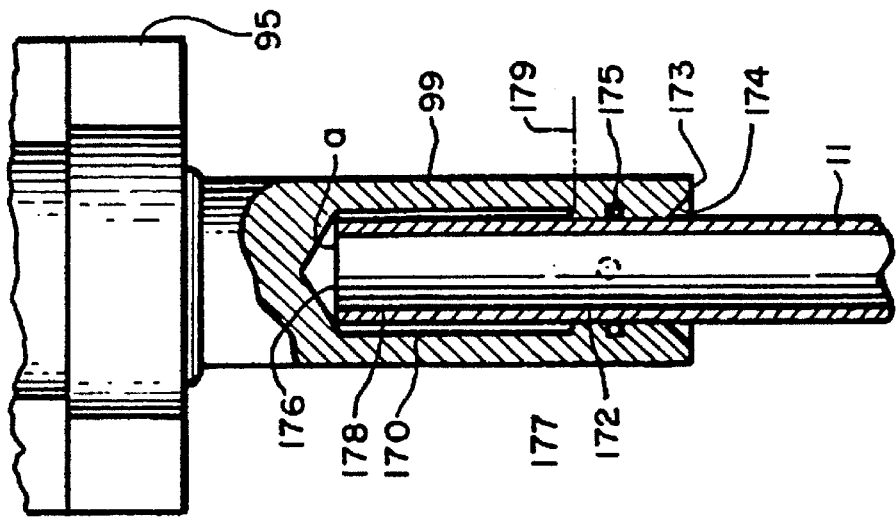
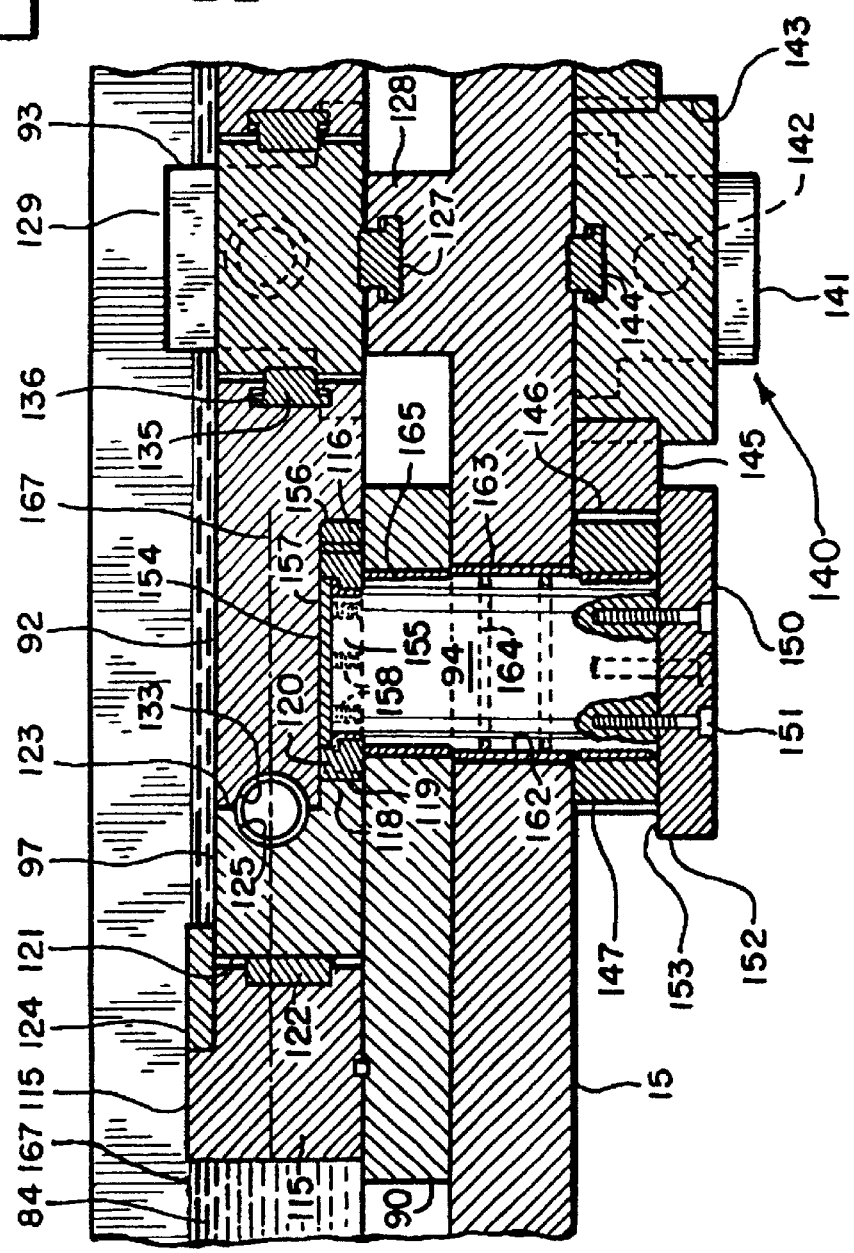

APPARATUS AND METHOD FOR FORMING A TUBULAR FRAME MEMBER

REFERENCE TO RELATED APPLICATIONS

This application is a division of patent application Ser. No. 08/263,325 filed Jun. 21, 1994, now U.S. Pat. No. 5,499,520, which is a division of patent application Ser. No. 08/077,616 filed Aug. 23, 1993 and issued as U.S. Pat. No. 5,353,618, which is a division of patent application Ser. No. 07/837,081 filed Feb. 12, 1992 and issued as U.S. Pat. No. 5,239,852, which is a continuation of patent application Ser. No. 07/482,782 filed Feb. 21, 1990, now abandoned, which is a continuation-in-part of patent application Ser. No. 07/398,272 filed Aug. 24, 1989 now abandoned, all of which are hereby incorporated by reference.

FIELD OF THE INVENTION

The present invention relates to the field of cold forming tubular materials and in particular to an apparatus and method for forming a complex-shaped tubular frame member from a tubular blank.

BACKGROUND OF THE INVENTION

The principal frame design for automobile frame members is of the "box" type construction for strength and load bearing purposes. These frame members often have great variation in both the horizontal and the vertical profile. The cross-section of such tube members also often varies rather extremely from approximately a square cross-section, to a rectangular cross-section to a round cross-section to a severely flattened cross-section, and to any irregularly shaped combination of the above. While some simple, large radiused profiles with varying cross-sections have been obtained by cold or heat forming a generally cylindrical tube blank, most current manufacturing methods produce the complex-shaped box section tube member by fabricating two "U" section stampings which are then welded together to form the finished part. Unfortunately, material and labor consumption in these processes is enormously inefficient. Also, evidence appears to show a significant noise level reduction where the box section frame member is formed from a tubular blank rather than the welded, double "U" section stampings.

The general operations of bending, stretching, depressing and radially expanding a tube blank, with or without a mandrel, are known. For the majority of metals, it is fairly easy to bend small diameter tubing into an arc having a large radius. But as the diameter of the tubing increases and the radius about which it is to be bent decreases, the tube bending process requires some combination of compression at the inner bending radius of the tube and stretching at the outer radius. Although the outer bending surface of the tube may be stretched to the full extent of the materials rated elongation characteristics, cannot satisfactorily bend a tube with a given diameter about a relatively small bending radius without encountering severe buckling at the inner bending surface or undesirable deformation at the outer bending radius. Some have achieved bending tubes with a certain diameter about relatively small bending radii by controllably dimpling or allowing controlled rippling of the inner tube surface thereby creating less stretching of the outer tube surface.

Other examples of methods for bending a tube are shown in U.S. Pat. No. 4,704,886 shows internally pressurizing a tube blank, gripping the opposite ends of the blank and applying longitudinal tension at the ends while applying a lateral force against the blank to bend the blank. U.S. Pat. No. 4,567,743 shows depressing regions of the tube blank and then expanding the blank within a complementary shaped cavity formed by a pair of dies. U.S. Pat. No. 4,829,803 discloses forming a box-like frame member by internally-pressurizing a preformed tubular blank, closing a pair of die halves around the blank, to partially deform the blank within mating die cavities, and then increasing the internal pressure to exceed the yield limit of the wall of the blank to expand the blank into conformity within the mating die cavities. In the '803 patent, the planar mating surfaces of the die halves are perpendicular to the side walls of the cavities, and the patent teaches that by providing a certain internal pressure to the tubular blank, upon closing the die sections, the blank will spread evenly throughout the cavity and will not be pinched between the closing, mating surface portions of the dies. This procedure may prove satisfactory where the width of the die cavities is much greater than the height. However, where the height of the die cavities is much greater than the width, as is often the case with complex-shaped, box section frame members, the tubular blank will simply not be pushed into the deep recesses of the cavity without pinching between the mating die halves.

What is needed is an apparatus which will form a tubular blank into a box section frame member having variations in the vertical and horizontal profile and in the cross-sectional configuration.

SUMMARY OF THE INVENTION

Generally speaking, the present invention provides an apparatus and method for forming a tubular blank into a box section frame member having variations in both the horizontal and vertical profile and in the cross-sectional configuration.

The process basically consists of two steps. First, a straight round tube of a pre-cut length is internally pressurized and bent in one or more locations along its length. This preformed tube is then located on the lower half (the die) of a punch and die and pressurized again. The upper half (the punch) then closes completely, producing the finally formed frame member. Before the tube is preformed, its ends are burnished to remove the cutting burr and to radius the outside, leading edge of the blank.

In the preforming stage, sealing units and the forming tools are completely submerged in an aqueous bath, allowing the tube to "fill itself" when placed therein. The sealing units then simultaneously seal and pressurize the blank and the blank is tangent bent, forming a pair of legs in horizontal profile. Inner and outer dies then close upon the legs, forming additional multiple bends in the horizontal plane. This preformed tube is then placed upon a lower, upwardly facing stuffing ledge of the die, the die defining a vertical, punch engaging wall which smoothly transitions at its bottom into the ledge, the ledge transitioning at an acute angle into a first vertical heel. A punch defines a vertical, die engaging wall which smoothly transitions at its top into an upper, downwardly facing stuffing ledge, the upper ledge transitioning at an acute angle into a second vertical heel, and the upper and lower ledges being in constant vertical alignment. The punch is adapted to ram down to a tube trapping position wherein the blank is disposed upon the lower ledge and the upper and lower ledges and the die engaging and punch engaging walls together define an enclosed cavity which traps the blank therein. The blank is then simultaneously sealed and pressurized to a less-thanburst pressure. The punch is then moved downward, bringing the upper and lower stuffing ledges to a final die position, thereby forming the finally formed frame member. To the extent the cross-sectional perimeter of the blank is less than the corresponding cross-sectional perimeter of the cavity formed by the mutually cooperating ledges, the internal pressure of the tube is increased to a pressure sufficient to cause outward deformation of the tube wall into the remaining recesses of the ledges. Like the preforming stage, the die components are sufficiently submerged in an aqueous bath so that upon placement of the preformed tube upon the lower ledge, the tube will "fill itself", facilitating the sealing and pressurization of the tube.

It is an object of the present invention to provide an improved tube forming apparatus.

It is another object of the present invention to provide an apparatus which will form complex-shaped frame members from tubular blanks.

It is another object of the present invention to quickly and economically produce shaped frame members from tubular blanks.

Further objects and advantages of the present invention will become apparent from the following description of the preferred embodiment.

BRIEF DESCRIPTION OF THE DRAWINGS

FIG. 1 is a side, elevational view of the apparatus for forming a tubular frame member in accordance with the preferred embodiment of the present invention.

FIG. 2 is a one-half plan view about centerline of symmetry 18 of the apparatus of FIG. 1.

FIG. 3 is a side, elevational view of the blank feeder and burnishing station I of the apparatus of FIG. 1.

FIG. 4 is a plan view of the blank feeder and burnishing station I of FIG. 3 with push down cylinders 58 omitted for clarity.

FIG. 5 is a side view, partly broken away, showing the operation of the push-up cylinder of blank feeder and burnishing station I of FIG. 3.

FIG. 6 is a side, cross-sectional view of the burnishing tool of the blank feeder and burnishing station I of FIG. 4.

FIG. 8 is a cross-sectional view of one side of the outer die 96 of FIG. 7 taken along the line 8—8 and viewed in the direction of the arrows.

FIG. 9 is an enlarged view of the tangent bend and prehydroforming station II of FIG. 7, and shown with the wing and dies in the closed and extended positions.

FIG. 10 is a side, cross-sectional view of the tangent bend and prehydroforming station II taken along the line 10—10 of FIG. 9 and viewed in the direction of the arrows.

FIG. 12 is an enlarged, partly cross-sectional view of the sealing tool of FIG. 9.

DESCRIPTION OF THE PREFERRED EMBODIMENT

Figure 7:
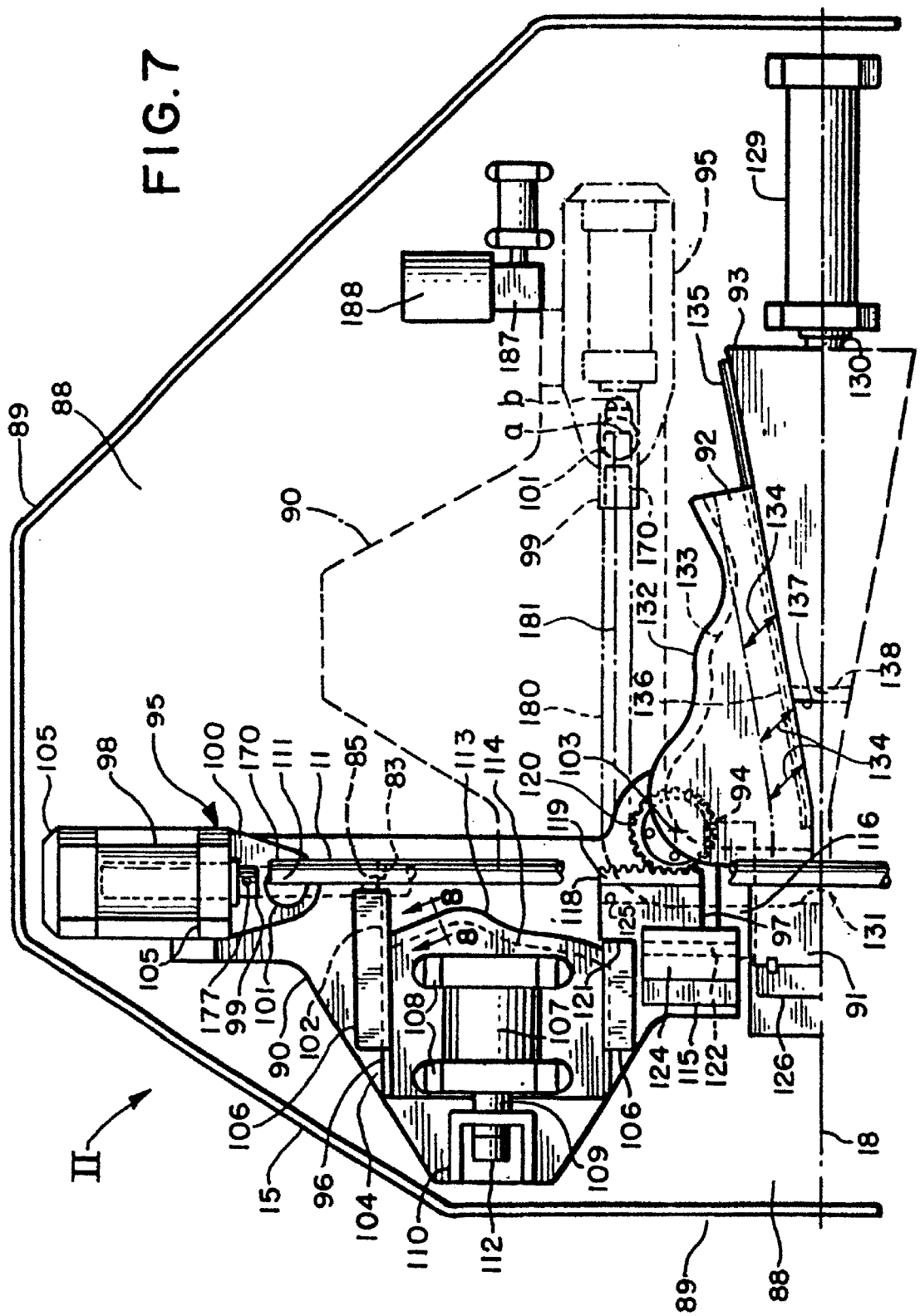
FIG. 7 is a plan view of one-half of the tangent bend and prehydroforming station II of the apparatus for forming a tubular frame member of FIG. 1, with the wing and dies shown in the open and retracted positions.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIGS. 1 and 2, there is shown an apparatus 10 for forming a complex shaped frame member (that is, one having a varying vertical, horizontal and/or cross-sectional profile) for an automobile in accordance with the preferred embodiment of the present invention. The invention described herein, however, may be adapted to form tubular frame members for a variety of structures. Apparatus 10 comprises a series of stations, namely a blank feeder and burnishing station I, a tangent bend and prehydroforming station II, a final hydroforming station III, and an end cropping and ejection station IV. Except where indicated, apparatus 10 and blank 11 are horizontally symmetrical about centerline 18.

Generally, apparatus 10 delivers a tube blank 11 from hopper 12, down ramp 13 and into liquid-filled tub 15 of station II. In tub 15, blank 11 is tangent bent and prehydroformed into preformed tube 16. A first lift mechanism 17 mounted on shuttle 14 of transfer system 19 lifts tube 16 from tub 15, transfers it laterally to an idle station 20, and places it upon idle station table 21. Shuttle 14 then translates back to its idle position (whereby mechanism 17 is midway between station II and idle station 20, second lift mechanism 22 is midway between idle station 20 and station III, and third lift mechanism 23 is midway between station III and station IV). While no machining occurs upon the tube 16 at station 20, each of stations I–IV then performs its respective operation upon the blank 11, tube 16 or finally formed frame member 25 located at that station. Shuttle 14 then translates to its rearward position (to the left as shown in FIG. 1) and second lift mechanism 22 then lifts tube 16 from table 21

(while first lift mechanism 17 is simultaneously lifting another tube 16 from tub 15), transfers it forwardly to hydroforming station III, and places it into a hydroform tub generally indicated at 24. Shuttle 14 then translates back to its idle position. In tub 24, preformed tube 16 is formed into frame member 25. Shuttle 14 then translates to its rearward position where third lift mechanism 23 lifts finally formed frame member 25 from tub 24, transfers it forwardly to end cropping and ejection station IV, and releases it there where the ends 29 are cropped to form the finished frame member 30.

STATION I

Referring to FIGS. 3 and 4, blank feeder and burnishing station I will now be described. Station I generally includes a hopper 12 with a pair of agitators 32, a ramp 13 with tube blow-out device 33, and a pair of burnishing units 50. Ramp 13 includes a pair of opposed, parallel, and declining runners 36 which form, at their rear, the floor 35 of hopper 12. Runners 36 are supported at the rear by opposed and vertical rear frame members 39 of hopper support frame 40 and at the front by ramp support frame 41. Hopper framing and walls 42 extend rigidly forwardly from rear frame members 39. A pair of opposed and parallel front guide members 37 are rigidly held by walls 42 to form a 90° angle with floor 35 in order to receive a square bundle 38 of tube blanks 11. Although the present invention may be adapted to operate with a variety of different tubular blanks, in the preferred embodiment, blanks 11 are welded steel tubes made from cold rolled steel, deep drawing quality, special killed, having an outside diameter of 2½ inches plus or minus one one-thousandth of an inch, and having a length of approximately 126 inches. The welds of the tubes are planished to provide a smooth, reliable, and constant outside diameter. Guide members 37 are sized and disposed so that the bottom end of each guide member 37 is spaced slightly more than 2½ inches above its respective runner 36, thus creating a pair of opposed escapements 43 through which tube blanks 11 may roll, one at a time, out of hopper 12 and down ramp 13.

A pair of identical agitators 32 are opposedly mounted to the inside of respective runners 36 and rearwardly of escapements 43. Each agitator 32 has a hydraulic drive cylinder 45 with a vertically extending piston rod 46 which vertically reciprocates a corresponding agitator rod 47. Interposed between agitators 32 and their hydraulic pressure source (not shown) is a flow divider (not shown) to ensure simultaneous and coinciding, reciprocating agitation. The up and down motion of agitator rods 47 provide appropriate agitation to ensure a constant and smooth flow of blanks from hopper 12, through escapements 43 and onto ramp 13.

Angle iron guides 48 are rigidly mounted as by welding to the outside of each runner 36. Each guide 48 extends upwardly from its runner 36, then inwardly to hold blanks 11 vertically and laterally in place on ramp 13.

Referring to FIGS. 3, 4 and 5, a pair of triangular-shaped stops 49 are fixedly secured to the forward ends of runners 36. A pair of opposed, identical and aligned burnishing units 50 are also mounted at the forward end of ramp 13, to a corresponding runner 36, and slightly behind stops 49. Each burnishing unit 50 includes a housing 55, a burnishing tool hydraulic drive cylinder 53, a tube blank hydraulic push-up cylinder 54, and a low pressure tube blank hydraulic push-down cylinder 58. Tube blanks 11 roll freely, side-by-side, down ramp 13 until the forwardmost blank 11 encounters stops 49. Push-up cylinders 54 and push-down cylinders 58 are positioned so that the axes of upwardly extending piston rods 56 of cylinders 54 and of downwardly extending piston rods 57 of cylinders 58 roughly intersect the axis of the forwardmost tube blank 11 which rests against stop 49. Upon actuation of low pressure, push-down cylinders 58, piston rods 57 extend downwardly against the corresponding blank 11. Actuation of push-up cylinders 54 quickly extends piston rods 56 upwardly against the bottom of the corresponding blank 11. Cylinders 54 are adapted to lift the blank 11, against the downward force of piston rods 57, up into alignment with burnishing units 50. While pressure is maintained in cylinders 54 and 58, blank 11 remains firmly clamped between piston rods 56 and 57 for the burnishing operation. The placement of drive cylinders 53, of cylinders 54 and 58 and of stops 49 is such that when a tube blank is firmly clamped between piston rods 56 and 57, the common axis 71 of tools 61 substantially coincides with the axis of the clamped tube blank. Cylinders 54 and 58 are spaced inwardly from the tube blank ends to provide clearance for the inward extension of the burnishing tool. Interposed between the two push-up cylinders 54 and their hydraulic pressure source (not shown) is a flow divider (not shown) to ensure the simultaneous and coinciding actuation of cylinders 54. A flow divider is likewise connected between push-down cylinders 58 and their pressure source.

During production of the tube blanks 11, the outside diameter is reliable to within about plus or minus one one-thousandths of an inch. However, during the production process, a small, inwardly extending dimple and an outwardly extending burr may be created at the end of the blank when the tube is cut to length. The outer ends of each tube blank 11 are therefore burnished. Referring to FIGS. 4 and 6, the burnishing operation of units 50 is performed by a burnishing tool 61 which is driven by a pair of identical, reciprocating and hydraulic tool drive cylinders 53. Each cylinder 53 has a piston rod 60 extending inwardly therefrom. Burnishing tool 61 is fixedly mounted to the end of piston rod 60 in an appropriate manner. Tool 61 includes an inner, pilot portion 63 and an outer, cylindrical portion 64. Outer portion 64 fixedly holds a cylindrical carbide bit 65, the interior surface 66 of which defines the desired outer diameter of the end 62 of tube blank 11. Cylindrical portion 64 and bit 65 together define a tapering lead 72. Pilot portion 63 defines a tapering lead diameter section 68, a substantially constant diameter section 69, and a chamfering diameter section 70. After a tube blank 11 is firmly clamped between piston rods 56 and 57 and is substantially aligned with axis 71, drive cylinders 53 are activated (by a hydraulic pressure source with a flow divider (not shown) interposed between the pressure source and cylinders 53 to ensure simultaneous actuation of both cylinders 53), shooting tools 61 inwardly. Tapering lead 72 opens outwardly enough to allow for slight misalignment between tools 61 and the ends 62. Bit 65 then passes over and around end 62, simply shaving off any outer surface metal or burr to the extent the outer diameter of end 62 is greater than the inner diameter of bit 65. As bit 65 passes around end 62, lead diameter section 68 enters end 62, followed by entry of constant diameter section 69, which pushes out any irregularities or dimples which might exist on the inside surface of end 62. At the end of the burnishing stroke, a curved surface 74 defined in bit 65 and the chamfering section 70 impact upon end 62 to form a radiused outer edge 75 and a lead-in inner edge 76, respectively. Tools 61 are then simultaneously retracted, leaving ends 62 with the desired outer diameter and shape. The axial length of tool 61 and bit 65 may vary depending upon the axial length of blank end 62 which is required to have a smooth and reliable diameter by the structure of sealing units 95 and 201 of stations II and III.

Referring to FIGS. 3 and 5, after tools 61 have been retracted, push-up cylinders 54 are retracted, somewhat slowly at first, whereupon the workpiece, blank 11, is unclamped and rolls forwardly off of piston rods 56, down the ramped sides of stops 49 and into tub 15 of tangent bend and prehydroforming station II.

Rearwardly of burnishing units 50, angle irons 48 define a pair of aligned holes at 77 and 78 which are spaced rearwardly of stops 49 so as to be aligned with the nth (6th in FIGS. 3–5) tube blank 79 back from stop 49. While the forwardmost tube blank 11 is being burnished, a high pressure air blast is delivered via air line 80, through hole 77 and into tube blank 79. Any loose dirt or debris is thereby blown out of tube blank 79 and through the opposing, aligned hole 78. A baffle 81 is provided at hole 78 to deflect the exiting airstream downward. An appropriate collection or filter device may be attached to baffle 81 to contain the dirt and debris.

Figure 11:
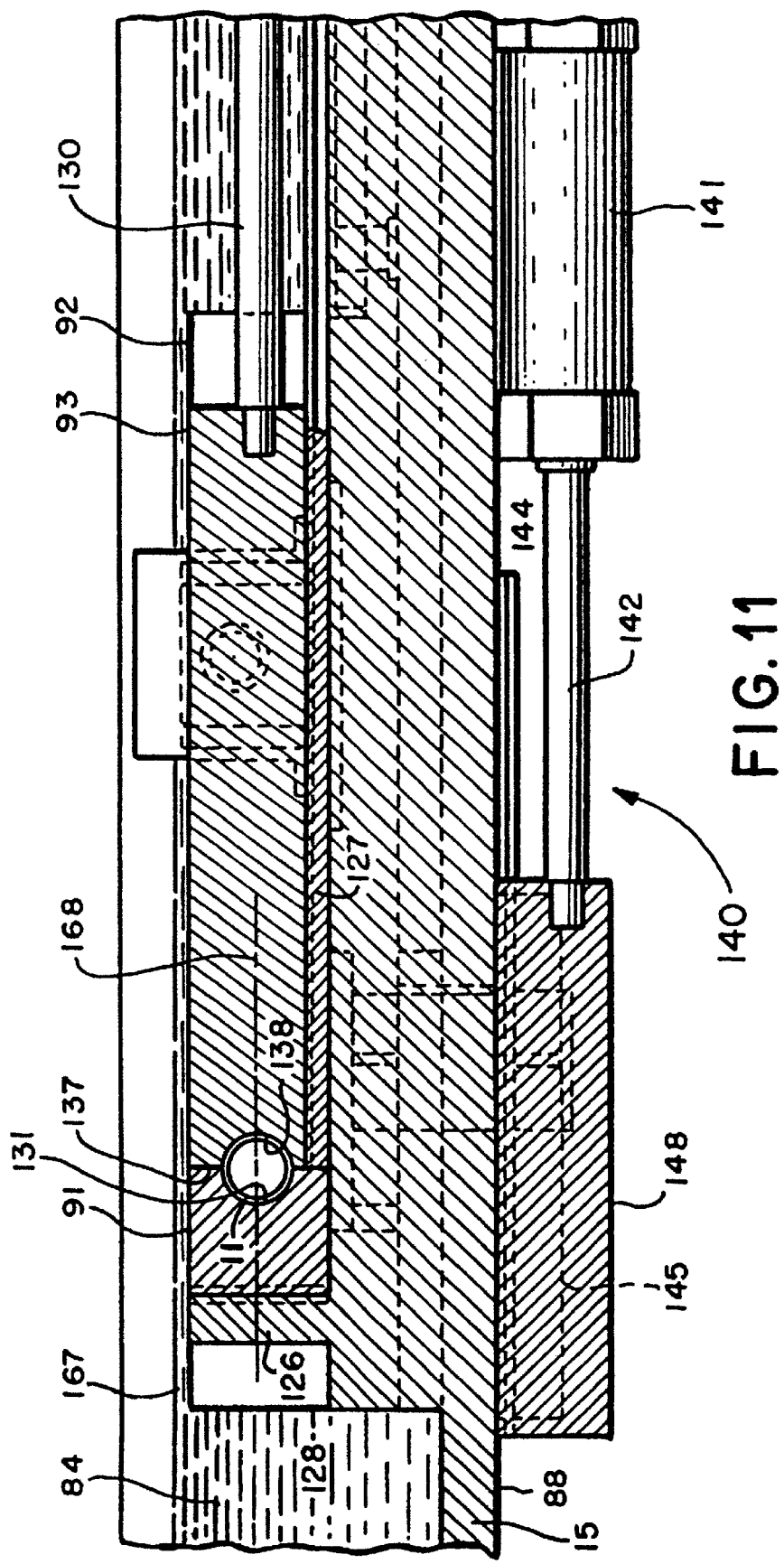
FIG. 11 is a side, cross-sectional view of the tangent bend and prehydroforming station II taken along the line 11—11 of FIG. 9 and viewed in the direction of the arrows.

As shown in FIGS. 3, 10 and 11, the forming operation of Station II is performed completely submerged in an aqueous bath 84 within tub 15. Appropriate means are provided to receive, guide and support blank 11 which has just been ejected from burnishing units 50 and has rolled into position at 86 in aqueous bath 84. A limit switch 85 (FIG. 7) is also provided which signals the receipt and proper placement of a blank 11 in the ready position 86.

STATION II

Referring now to FIGS. 7–12, there is shown one-half of tangent bend and prehydroforming station II. The machine elements of station II are generally symmetrical about centerline 18 and the following description will be made with regard to just one-half of station II as shown in FIG. 7 (and FIGS. 9–11, as indicated).

Station II generally includes a tub 15 having a base 88 and walls 89 which hold an aqueous bath 84 (FIGS. 1, 10 and 11). Bath 84 comprises a high water base fluid such as Hydro-Lube 120-B, commercially available from Howghton Co. Referring to FIG. 7, tub 15 supports and contains a wing 90, a die block 91, an inner die 92 and a wedge 93, all of which lie substantially submerged in aqueous bath 84. Wing 90 is mounted to pivot about a post 94 and its axis 103 between an opened position (shown in solid lines) and a closed position (shown in phantom). Wing 90 carries a tube sealing unit 95, an outer die 96, and a tangent bend wiper shoe 97.

Sealing unit 95 has a saddle plate 100 which is mounted by saddle plate pivot pin 101 to pivot about vertical axis 111. A hydraulic cylinder assembly 98 is fixedly mounted to saddle plate 100 by brackets 105 and has an outwardly extending piston rod which defines at its outer end a sealing tool 99. The solid-lined sealing unit 95 shows sealing tool 99 fully retracted while the phantom lined sealing unit 95 shows sealing tool 99 fully extended. Hydraulic pressure is supplied to cylinder 98 at port 177 by a conventional hydraulic line (not shown).

Referring for a moment to FIG. 12, sealing tool 99 is shown fully extended and engaged with the end 170 of a blank 11. Tool 99 defines an axial bore 172. At the leading edge 173 of tool 99, bore 172 is counterbored forming a chamfer 174. An o-ring 175 is seated within an annular cavity in bore 172, just inside from leading edge 173. Hydraulic port 177 extends through the wall at the top of tool 99. Conventional pumping means (not shown) are provided to deliver the solution of hydraulic bath 84, under pressure, to port 177. The means includes a conventional relief valve (not shown) which is set to a desired relief pressure is described herein. The diameter of bore 172 is about thirty thousandths of an inch larger in diameter at 178 (slightly exaggerated in FIG. 12 for description), inside of a line 179 located between o-ring 175 and relief port 177, thus providing free fluid communication between the inside of blank 11 and port 177.

Referring back to FIG. 7, outer die 96 is supported at opposite sides for sliding movement between a retracted position (FIG. 7) and an extended position (FIG. 9) by a pair of gibs 106. Gibs 106 each define an inwardly extending, overhanging flange 102 which mates with a corresponding outwardly extending, bottom flange 104 of die 96 to hold die 96 for lateral sliding movement atop wing 90. Gibs 106 are heeled and screwed (not shown) to wing 90. Die 96 is reciprocated between the retracted and extended positions by hydraulic cylinder assembly 107. Cylinder assembly 107 is mounted to die 96 by brackets 108. The outer end of piston rod 109 of assembly 107 is fixed to wing 90 by appropriate means such as a bracket 110 fixed to wing 90 and a bolt 112 which extends through bracket 110 and is fixed into the end of piston rod 109. With piston rod 109 secured to wing 90 via bracket 110, extension and retraction of piston rod 109 causes die 96 to slide laterally between its extended and retracted positions. The right side 113 of die 96, as shown in FIG. 7, is contoured and defines a mold cavity 114 which generally defines the desired plan view shape of a finally formed frame member. As seen in FIG. 8, mold cavity 114 of the present embodiment has a semicircular cross-section matching that of tubular blank 11. The cross-section of cavity 114, or of any of the subsequently described cavities, may of course be defined in a variety of shapes to form the desired plan view shape (both overall and in cross-section) of preformed tube 16 during the operation of station II.

Tangent bend wiper shoe 97 rests atop wing 90 between post 94 and anchor block 115. Referring now to both FIGS. 7 and 10, shoe 97 is shown having an inwardly extending lower portion 118. Lower portion 118 defines gear teeth 119 which are in constant meshing engagement with fixed pinion 120. Pinion 120 is keyed in a fixed position to a block 116 which is keyed and heeled to die block 91. Abutting the back edge 121 of shoe 97 is a bronze wear plate 122 which is heeled in a complementary slot in anchor block 115 and against which shoe 97 slides as wing 90 rotates. An upper bronze wear plate 124 overlaps shoe 97 and is appropriately secured atop anchor block 115 to hold shoe 97 vertically in place. The inside side 123 of shoe 97 defines a semicylindrical mold cavity 125 with a radius equal to the outer radius of tube blank 11.

Referring now to FIGS. 7 and 11, a die block anchor post 126 extends upwardly from tube base 88. Die block 91 rests atop a riser portion 128 of base 88 and is keyed to post 126 against lateral movement. Die block 91, like shoe 97, defines a semicylindrical mold cavity 131 with a radius equal to the outer radius of tube blank 11.

Referring to FIGS. 7, 9, 10 and 11, wedge 93 rests atop and is T-keyed at 127 to a riser portion 128 of tub 88 to slidably reciprocate along centerline 18. Key 127 is both heeled and screwed (not shown) into the bottom of wedge 93. A hydraulic cylinder assembly 129 is fixedly mounted to tub base 88. The outwardly extending end of piston rod 130 of assembly 129 is appropriately fixed to wedge 93. Extension and retraction of piston rod 130 thus moves wedge 93 along centerline 18 between a retracted position (FIG. 7) and an extended position (FIGS. 9, 10 and 11). The end 137 of wedge 93, opposite piston rod 130 and like die block 91, defines a semicylindrical mold cavity 138 with a radius equal to the outer radius of tube blank 11.

Inner die 92 defines a contoured outer side 132 which defines a mold cavity 133. Like mold cavity 114 of outer die 96, side 132 defines a semicircular cross-section which is in the shape of the corresponding portion of the desired finally formed frame member. Like wedge 93, inner die 92 rests atop and is keyed to riser portions (not shown) to slidably reciprocate in the direction of arrows 134 between a retracted position (FIG. 7) and an extended position (FIGS. 9, 10 and 11). Die 92 is caused to reciprocate between its extended and retracted positions solely by the camming action between T-key 135 of wedge 93 and T-key slot 136 of die 92 as wedge 93 is reciprocated between its retracted and extended positions by cylinder assembly 129. T-key 135 is heeled and screwed (not shown) to the side of wedge 93.

Mounted below tub base 88 is the drive assembly 140 which reciprocates wing 90 between its open and closed positions. Drive assembly 140 includes a hydraulic cylinder assembly 141 secured to the underside of base 88. The outer end of piston rod 142 of assembly 141 is secured in an appropriate manner to a drive beam 143 which is supported and guided by T-key 144 to slide along centerline 18. T-key 144 is heeled and screwed (not shown) to the bottom of base 88. A rack 145 is heeled and keyed (not shown) to beam 143 and has gear teeth at 146 which mesh with a pinion 147. A circular retainer plate 150 is bolted by screws 151 to the bottom of post 94, trapping coaxial pinion 147 between plate 150 and base 88. Plate 150 defines an annular shoulder 152 within which is seated a bronze wear ring 153. Rack 145 slides atop wear ring 153 as rack 145 meshes with and rotates pinion 147.

The top of post 94 defines a reduced diameter portion 155, about which is seated a coaxial, bronze wear bushing 156 and coaxial pinion 120. Pinion 120 is supported atop wing 90, but is keyed in a fixed, non-rotating position by block 116 (FIG. 7). Wear bushing 156 has a cylindrical portion and an upper, outwardly extending, annular flange portion seated in a complementary annular shoulder in pinion 120. Together, bushing 156 and pinion 120 define an annular shoulder 157 within which is seated a circular retaining cap 154. Cap 154 is screwed to reduced diameter portion 155 by screws 158. Post 94 is primarily supported by wing 90 via keys 165. Cap 154 via that portion of cap 154 which is seated in shoulder 157 provides insurance to support post 94, retaining plate 150, ring 153 and pinion 147 in the event that keys 165 should loosen. Post 94 extends through a complementary opening 162 defined in base 88 with a coaxial, cylindrical bronze bushing 163 interposed therebetween. A pair of spaced o-rings 164 are disposed within appropriate annular grooves in post 94 to seal against leakage from tub 15. Wing 90 is keyed to rotate as a unit with post 94 by keys 165. Finally, tub 15 is filled with aqueous bath 84 to a level 167 well above the semicircular cross-sectioned cavities 114, 125, 131, 133 and 138 of outer die 96, shoe 97, die block 91, inner die 92 and wedge 93, respectively. Preferably, the fluid level 167 is maintained roughly at or above the top of dies 92 and 96, as shown in FIGS. 10 and 11.

It should be noted that the centerlines of each cavity (line 167 of cavities 125 and 133, FIG. 10, and line 168 of cavities 131 and 138, FIG. 11, for example) all lie in the same plane. In other words, the forming operation of station II occurs exclusively by the horizontally applied pressure of wiper shoe 97, dies 92 and 96, wedge 93 and die block 91.

Referring to FIGS. 7–12, the operation of tangent bending and prehydroforming station II is as follows:

At the end of the burnishing operation of station I, when tube blank 11 is released by push-up cylinder 54, the components of station II are as they appear in FIG. 7: wing 90 is in the open position and outer die 96, inner die 92 and sealing cylinder tool 99 are all retracted. Upon release from push-up cylinder 54, blank 11 rolls off stops 49 and into tub 15, sinking immediately into bath 84, below fluid level 167, and resting atop extended portion 118, pinion 120 and an appropriate blank support 83. Blank support 83 includes a limit switch 85 which verifies that blank 11 has been received in the appropriate ready position 86. With dies 92 and 96 retracted, blank 11 in ready position 86 rests horizontally aligned with cavities 114, 125, 131, 133 and 138 of outer die 96, shoe 97, die block 91, inner die 92 and wedge 93, respectively. Limit switch 85, along with any other appropriate and desired sensors disposed throughout apparatus 10, send signals to a microprocessor (not shown) which governs the overall operation of machine 10.

After verification of the proper positionment of blank 11, cylinder assembly 129 extends wedge 93 along centerline 18, whereby inner die 92 is translated along arrows 134 into its extended position, and whereby the leftmost portion of cavity 133 (as shown in FIG. 7) contacts blank 11 and moves it leftwards, into cavities 131 and 125 of die block 91 and shoe 97, respectively. Once wedge 93 and inner die 92 are fully extended, cavity 138 and the leftmost portion of cavity 133 mate with opposing cavity 131 to completely encircle and firmly clamp the central length of blank 11 while cavity 125 of shoe 97 half-way encircles a neighboring length of blank 11. Blank 11 is now axially aligned with sealing tool 99 of sealing unit 95. Further, hollow tube blank 11 and sealing tool 99, being completely submerged within bath 84, are both automatically filled with the aqueous solution of bath 84.

Cylinder assembly 98 is now actuated whereby sealing tool 99 extends and telescopically surrounds distal end 170 of blank 11. (FIG. 12) Counterbore 174 of tool 99 allows for possible minor misalignment between distal end 170 and sealing tool 99 during engagement of tool 99. The radiused edge 75 of blank 11 reduces the risk of chafing to o-ring 175 as tool 99 telescopically extends over end 170. As tools 99 (there is an identical companion tool 99 simultaneously operating at the other distal end of blank 11 on the unshown half of station II) simultaneously extend onto the respective distal ends 170, o-rings completely seal the interior of blank 11, and tools 99 become pistons, compressing and increasing the pressure of the liquid within blank 11 and bores 178. As tools 99 extend through their full stroke, the pressure within blank 11 and bores 178 is relieved via ports 177 and the relief valves connected thereto (not shown) as necessary to maintain the desired internal pressure. The slightly larger diameter portion 178 of bore 172 inside of line 179, as shown in FIG. 12, ensures an unobstructed flow of fluid from within blank 11 and out of port 177.

The pressure relief valves (not shown) connected to relief ports 177 are set at the value of desired pressure within blank 11, which, in the present embodiment, is just below the burst pressure of blank 11 which is approximately 2880 p.s.i. The burst pressure is determined approximately by $P_{burst}=(2 \times th \times TS)/(2 \times r)$ where th=the wall thickness of blank 11; TS=the tensile strength of blank 11; and, r=the inside radius of blank 11. Here TS=45,000 p.s.i.; th=0.08 inches; and, r=1.25 inches.

Once sealing cylinder 99 is fully extended and surrounding distal end 170, distal edge 176 of blank 11 will extend about 10 inches into bore 172 as shown at position a (FIGS. 7, 9 and 12); tube blank 11 and bore 172 will be filled with the aqueous solution of bath 166; and the pressure of the solution within blank 11 will be somewhat below the burst pressure of about 2880 p.s.i.

With the pressurized fluid within blank 11 forming a flexible mandrel, tangent bend cylinder assembly 141 is now actuated, extending drive beam 143 and rack 145, and turning pinion 147, post 94 and wing 90. As wing 90 rotates, wear plate 122 of block 115 revolves about post axis 103 and bears against shoe 97. Since pinion 120 is fixed against rotation, shoe 97 is caused to tangentially roll about pinion 120 and, at the same time, to tangentially bend tube blank 11 around cavity 133 of inner die 92. By selecting the proper configuration, placement and dimensions of shoe 97, block 115, pinion 120 and inner die 92, shoe 97, via its cavity 125, primarily "wraps" rather than "slides" about blank 11. This causes the inside portion (adjacent to cavity 133) of the 2½ inch diameter tube blank 11 to "wrap" and not wrinkle. Obviously, the balance of the blank must stretch to generate the desired form. In the present embodiment, the pitch diameter of pinion 120 is four inches which places the intersection of the pitch circle of pinion 120 and of the pitch line of the gear teeth of portion 118 approximately vertically aligned with the innermost portion of mold cavity 133. This creates nearly perfect tangential bending at the innermost side of blank 11 (i.e., no stretching and no compressing). By replacing pinion 120 with a pinion having a larger pitch diameter and replacing shoe 97 with a narrower shoe (i.e., portion 118 with the gear teeth extends just far enough from block 115 to mesh with pinion 120) the intersection of the pitch circle of pitch line of geared pinion 120 and the extended portion 118 will be vertically between the inner and outer side of blank 11 thereby causing some compression of the inner side and lessening the amount of stretch at the outer side.

At the end of its rotation, wing 90 has rotated 90° to its closed position, and blank 11 has been bent 90° about inner die 92 (shown in phantom in FIG. 7). Sealing unit 95, pivotally mounted at pin 101, has followed and remained coaxial with end 170 of blank 11. The bending has caused distal end 170 to telescopically retract about 2 inches from within sealing tool 99 (indicated as position b in FIGS. 7 and 9), but seal 175 (along with hydraulic pressure source connected at port 177) has maintained the desired less-than-burst pressure within blank 11.

A piston actuated locking block 187 is next extended to lodge adjacent to and between the end of wing 90 and a back-up block 188 which is fixed to tube base 88 (shown in solid lines in an unlocked position in FIG. 7). Before cylinder assembly 107 is actuated, block 187 is extended to a locking position (FIG. 9).

With inner die 92 still extended (as shown in FIG. 9), cylinder assembly 107 is next actuated, extending outer die 96 toward inner die 92 and against blank 11. As die 96 approaches and finally mates with inner die 92, straight, tangent bent leg 180 of blank 11 is prehydroformed into a leg 183 having the desired plan view configuration defined by the mutually cooperating cavities 114 and 133. The vertical axis 111 of pivot pin 101 is located at the intersection of axis 181 (of tangent bent leg 180) and axis 184 (the axis of distal end 170 after the forming operation of dies 92 and 96). Sealing tool 99 thus pivots about axis 111 during the prehydroforming operation, and maintains a seal on distal end 170. At the end of the prehydroforming operation by dies 92 and 96, distal end 170 retracts another three inches from within sealing tool 99 (indicated as position c in FIG. 9).

Block 187 is retracted to the unlocked position, sealing tool 99 is retracted, wing 90 is pivoted to the open position, and dies 92 and 96 are retracted, thereby releasing preformed tube 16. Shuttle 14 then translates to its rearward position where first lift mechanism 17 rams down, clamps shaped tube 16, and rams up with tube 16. Shuttle 14 then translates to its forward position where mechanism 17, now at idle station 20, rams down and releases tube 16, placing it onto table 20. Mechanism 17 rams up and shuttle 14 translates back to the idle position. Appropriate means are provided for pivoting sealing unit 95, upon opening of wing 90, back to its starting position (as shown in FIG. 7) to engage with the next tube blank 11.

STATION III

Figure 13:
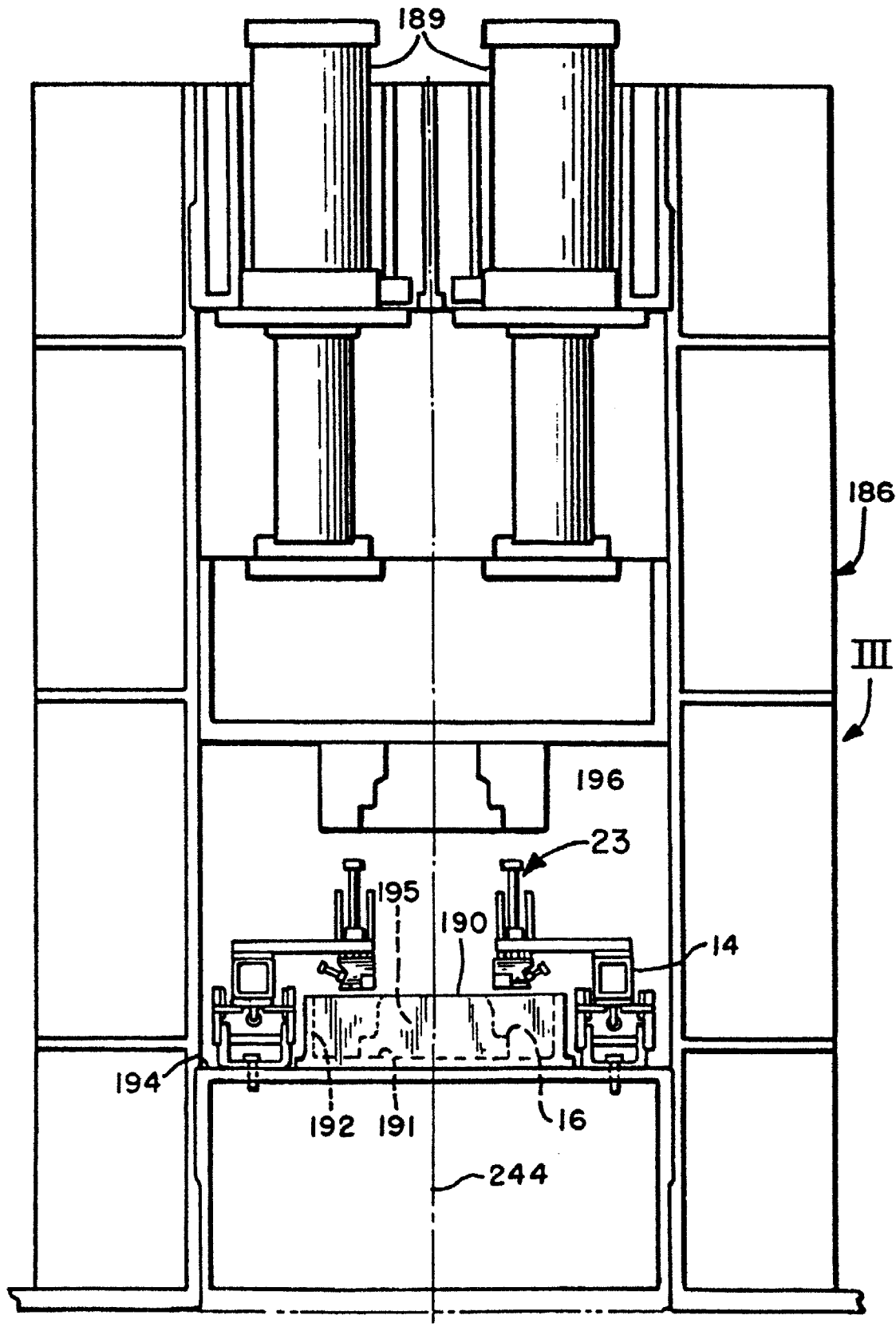
FIG. 13 is an end, elevational view of the final hydroforming station III of the apparatus for forming a tubular frame member of FIG. 1.

Referring to FIG. 13, there is shown an end view of hydroforming station III wherein a preformed tube 16 is formed within a special stuffing-ledge arrangement in a die 195 and a punch 196. Station III generally includes a variable ram speed hydraulic press 186 having a pair of overhead hydraulic cylinder assemblies 189 which vertically reciprocate a punch 196. A tub 190 having a base 191 and walls 192 is supported upon a press bed 194. Tub 190 is filled to an appropriate level with the same aqueous bath which is contained in tub 15 of station II. Punch 196, as shown in FIG. 13, is in a fully retracted position.

Referring to FIGS. 14–16 and 18, die 195 includes a central post portion 202 which defines an outwardly facing, contoured, and vertical, punch engaging wall 203. The base of wall 203 smoothly transitions into upwardly facing ledge 199 which defines the bottom half of the part print of a finally formed frame member 25. Below and outwardly from ledge 199, die 195 defines an outwardly facing, contoured, and vertical heel 204.

Figures 18, 19:
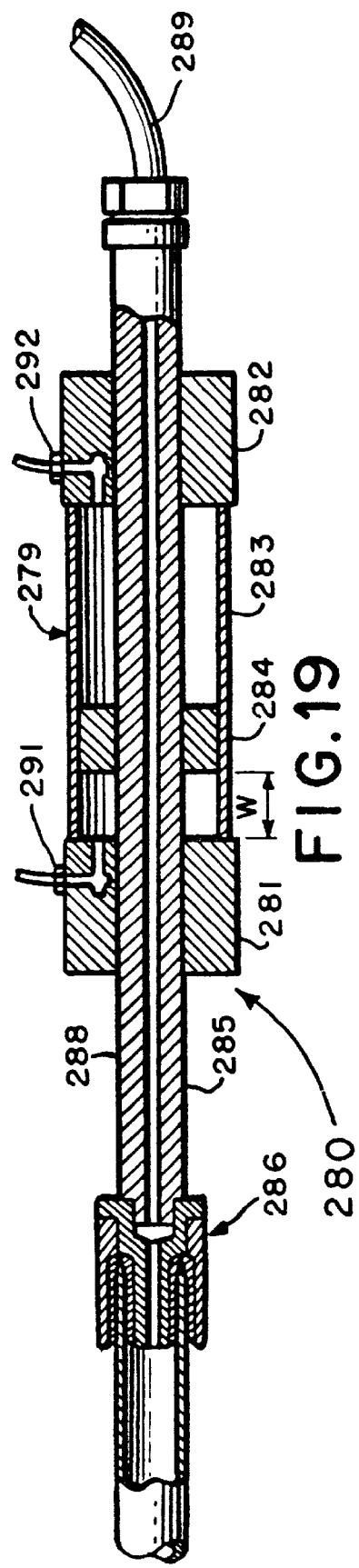
FIG. 18 is an enlarged, cross-sectional view of a portion of the punch and die of the final hydroforming station III of FIG. 15.
FIG. 19 is an enlarged, partly cross-sectional view of a combination burnishing and sealing unit in accordance with another embodiment of the present invention.

Punch 196 defines a complementary, downwardly extending post portion 207 which defines an inwardly facing, vertical, die engaging wall 208. Die engaging wall 208 is contoured to telescopically engage with heel 204 in substantially complete adjacent engagement. Wall 208, at its top, smoothly transitions into a downwardly facing ledge 210 which defines the upper half of the part print of a finally formed frame member 25. Punch 196 further defines, inwardly from ledge 210, an inwardly facing and vertical heel 209. Heel 209 is contoured to telescopically engage with outwardly facing, punch engaging wall 203 in substantially complete adjacent engagement. That is, as punch 196 rams vertically downward, ledge 210 is in constant alignment above ledge 199, vertical heel 209 slides along vertical wall 203, and vertical wall 208 slides along vertical heel 204. The plan view of both ledges 199 and 210 is substantially identical to the plan view of preformed tube 16 as formed in tangent bend and prehydroforming station II. As shown in FIG. 18, the lower portion of punch engaging wall 203 smoothly transitions into ledge 199. The transition between ledge 199 and heel 204, on the other hand, forms a severely acute angle as seen at 211. The intersection between ledge 199 and heel 204, along its entire length, is radiused off at 212 with a radius of approximately ⅜ths of an inch. This radius may vary depending on the characteristics of the tube being formed and the forces to which it is to be subjected. In the present embodiment, a ⅜ths inch radiusing at 212 is too small to result in outward deformation of tube 16 into the gap 205 created between radiused edge 212 and wall 208 during the below-described step of boosting the internal pressure within tube 16. This is because the boosted pressure applied to the interior of tube 16 is insufficient to cause deformation of the walls of tube 16 into an area the size of gap 205. The transitions between die engaging wall 208 and ledge 210 and between ledge 210 and heel 209 of punch 196 are similarly sized.

Figure 15:
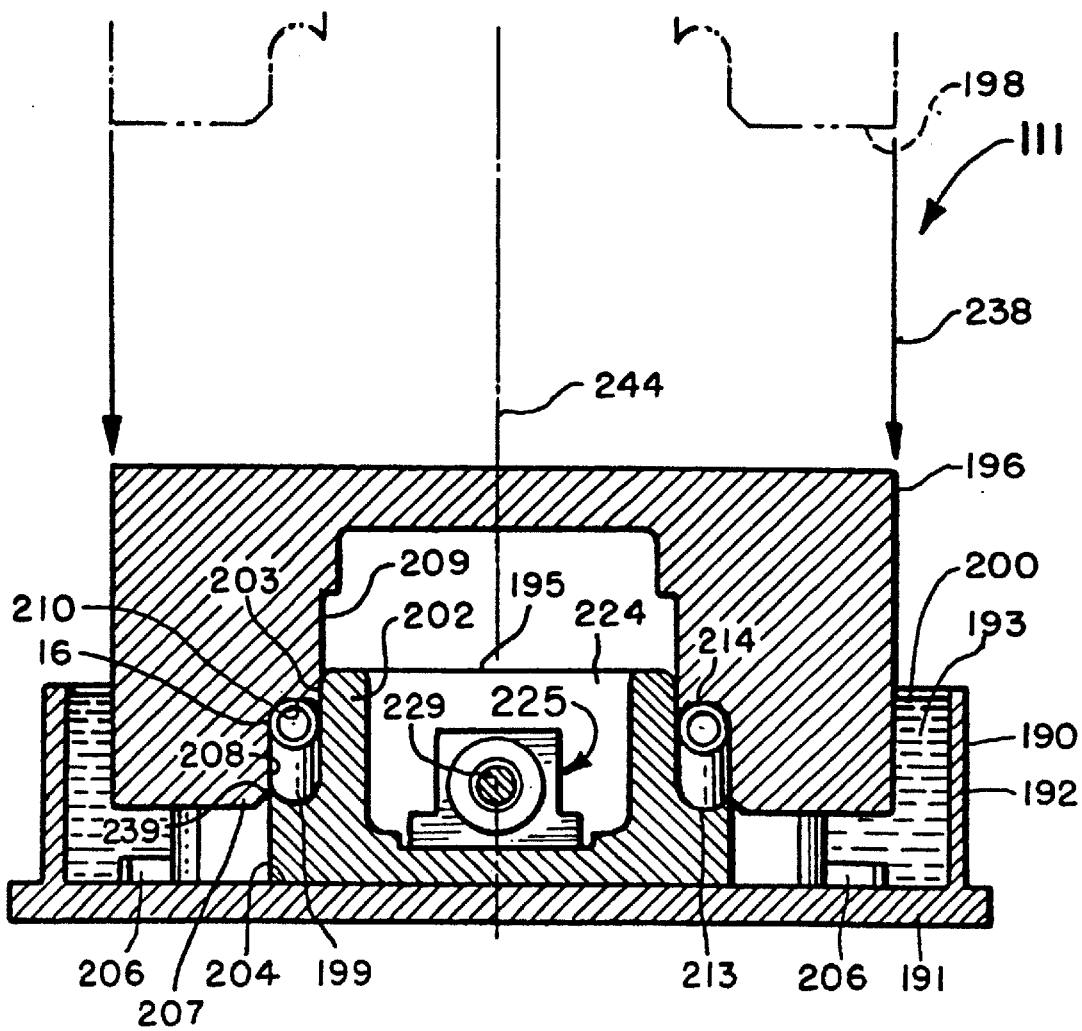
FIG. 15 is an end, cross-sectional view of the punch and die of the final hydroforming station III of FIG. 14, shown in the tube trapping position, taken along the line 15—15 of FIG. 14 and viewed in the direction of the arrows.
Figure 16:
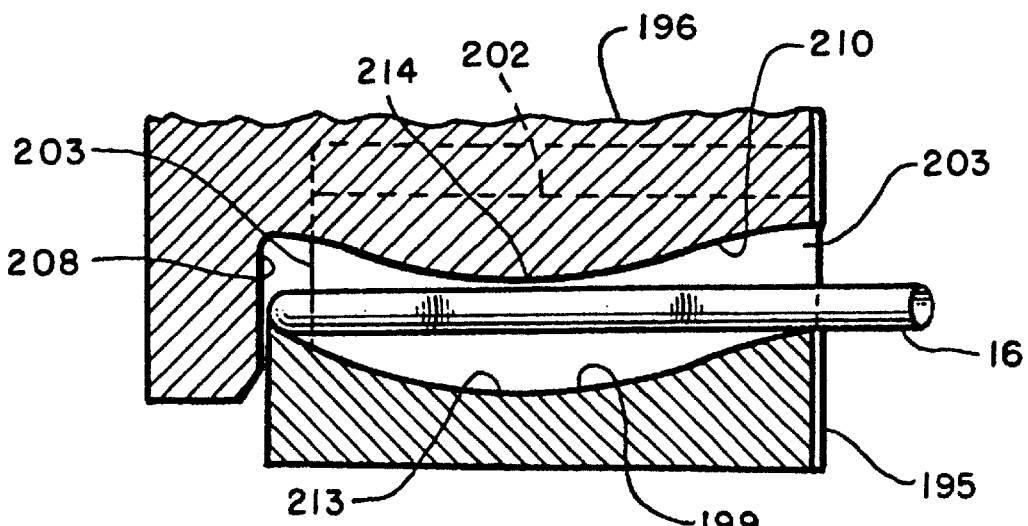
FIG. 16 is a side, cross-sectional view of the punch and die of FIG. 15, in the tube trapping position, and taken along the lines 16—16 of FIG. 14 and viewed in the direction of the arrows.
Figure 17:
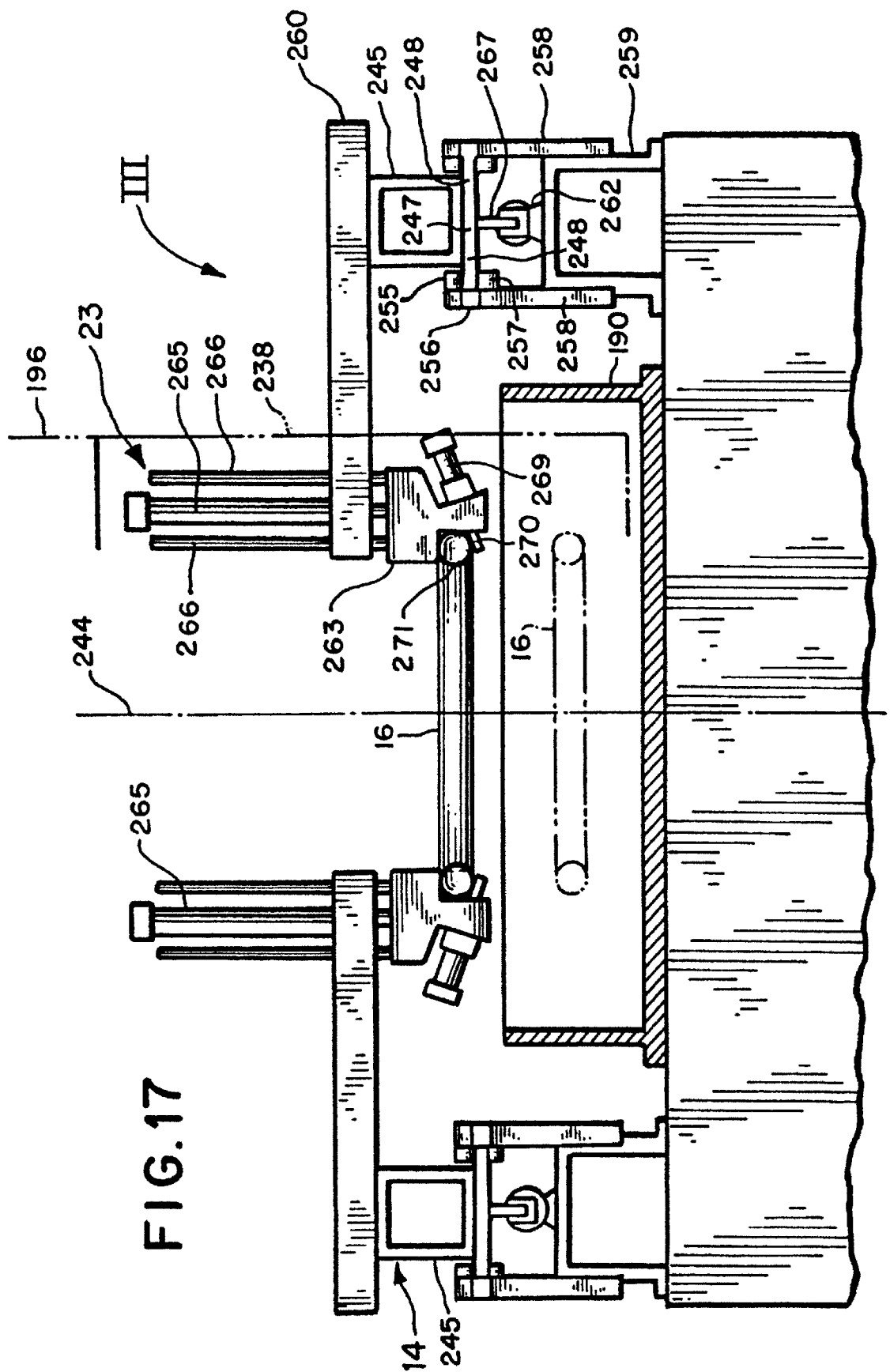
FIG. 17 is an enlarged, end view of the final hydroforming station III of FIG. 13 and showing the transfer system.

As evidenced by the elevational view of finally formed frame member 25 in FIG. 1, ledges 199 and 210, in the present embodiment, both vary vertically over their length. The central sections (213 and 214) of both ledges 199 and 210 project downwardly. Thus, as seen in FIGS. 15 and 16, when preformed tube 16, having a horizontally straight profile, is laid upon die 195, surrounding central post 202, tube 16 will contact ledge 199 only at the front and rear portions. When punch 196 is rammed down, toward die 195, only the central, downwardly projecting portions 214 of ledge 210 will first contact tube 16. Further downward movement of punch 196 will of course begin to bend tube 16 between ledges 199 and 210.

Vertical movement of the punch 196 is controlled by transducers which govern the operation of cylinder assemblies 189. Four stop blocks 206 are mounted to base 191 of tub 190 and are sized to be hit by the bottom of punch 196, thereby defining the lower limit of its stroke. At its lower limit, punch 196 is fully extended and engaged with die 195. A closed cavity is thereby defined between ledges 199 and 210 which cavity is the part print of finally formed frame member 25. In the present embodiment, the cross-sectional configuration of the closed cavity formed between ledges 199 and 210 varies considerably along the entire length thereof. At some points along that length, the perimeter of the cross-section defined by the closed cavity is larger than the perimeter of the corresponding cross-section of the preformed tube 16 which is to be placed and formed therein.

Sealing units 201 are mutually identical and are similar in nature to the sealing units 95 of station II. Each sealing unit includes a hydraulic cylinder assembly 217 having an outwardly extending piston rod 216 with a sealing tool 218 rigidly connected at the end thereof. Tool 218 defines a bore 219 within which is seated an o-ring 220 a short distance back from leading edge 221. Bore 219 is counterbored to form a lead-in 215 to allow for any misalignment between end 170 and bore 219. Each tool 218 is mounted for reciprocal sliding movement by gibs 233 along the corresponding common axis 236 of piston rod 216 and of end 170 of tube 16 as initially placed upon die 195. Each tool 218 defines a pair of outwardly extending flanges 234 which extend into mating slots 236 in gibs 233. Gibs 233 are appropriately mounted to tub base 191. Unlike sealing unit 95 of station II, hydraulic ports 222 are defined in corresponding tools 218 so as to never be located over any portion of tube 16 when tool 218 is fully extended and engaged with tube end 170.

Central post portion 202 of die 195 defines a central cavity 224 within which is mounted hydraulic pressure intensifier 225. Intensifier 225 generally includes a first hydraulic cylinder 226 with a piston 228. Cylinder 226 is driven by an appropriate hydraulic pressure source (not shown), via ports 231 and 232, and uses oil as the driving fluid. Reciprocation of piston 228 causes its piston rod 229 to reciprocate within separate cylinder 227, the end face 230 of piston rod 229 forming a piston within cylinder 227. In the present embodiment, the effective cross-sectional area of piston 228 is roughly four times greater than the effective cross-sectional area of piston face 230, resulting in a pressure increase from cylinder 226 to cylinder 227 of about 4-to-1. Connected to each port 222 is a low-pressure relief valve (not shown) which is set at the just-less-than burst pressure (about 2880 p.s.i.). The low pressure relief valve vents excess pressure from bores 219 back into the aqueous bath 193 as is described herein. Inlet/outlet port 240 of cylinder 227 is also connected to both ports 222, and independent of the low-pressure relief valve. Appropriate switching mechanisms are provided relative to ports 222, port 240 and the low pressure relief valve to provide the desired hydraulic operation as described herein. A high pressure relief valve (not shown) is also provided at port 240 to limit the pressure applied from cylinder 227 to bores 219 to the desired boosted pressure (about 9600 p.s.i.).

Operation of the hydroforming apparatus of station III is as follows:

With punch 196 in the upwardly retracted position (as shown in FIG. 13 and indicated at 198 in FIG. 15) and tools 218 fully retracted, second lift mechanism 22 transfers a preformed tube 16 from idle station 20 to hydroforming station III and places it onto ledge 199. Lift mechanism 22 then releases tube 16 and retracts and shuttle 14 returns to its idle position. As soon as lift mechanism 22 clears the path 238 of punch 196, punch 196 quickly rams down to a tube trapping position (FIGS. 15, 16 and 18). At this position, downwardly projecting, central section 214 of ledge 210 is just above tube 16. Also, downwardly extending post portion 207 has substantially surrounded tube 16 and a portion of die 195. At this point, the bottom edge 239 of die engaging wall 208 has passed below the radiused edge 212 of ledge 199 at its lowest point (213). If tube 16 was not completely vertically aligned with ledge 199—i.e., sprung slightly outwardly—, post portion 207 of punch 196 will cam tube 16 inwardly to its proper, vertically aligned position. Further, tub 190 is filled with the aqueous bath 193 to a level 200 which is well above tools 218 and above the top of tube 16 as placed upon die 195. Upon placement of tube 16 into tub 190 and onto die 195, tube 16 is thus automatically filled with the solution of aqueous bath 193. Tube 16 is now completely trapped within a stuffing ledge cavity defined by ledges 199 and 210 and vertical walls 203 and 208; and tube 16 and bores 219 of tools 218 are entirely filled with the solution of bath 193. Punch 196 now dwells momentarily while sealing tools 218 simultaneously, telescopically extend around now aligned ends 170 of tube 16. Like o-rings 175 of sealing units 95 of station II, o-rings 220 of sealing units 201 are capable of maintaining a seal for the approximately 2880 p.s.i. to be exerted within tube 16. As o-rings 220 extend and engage and seal ends 170, a closed volume is formed by tube 16 and bores 219 except for ports 222. The low-pressure relief valves (not shown) connected at ports 222 relieve the excess hydraulic pressure in tube 16 as tools 218 are further extended.

With tools 218 fully extended, with the internal hydraulic pressure of tube 16 roughly at the less-than-burst pressure, and with punch 196 dwelling at the tube trapping position shown in FIGS. 15 and 16, punch 196 rams down until it hits stop blocks 206. Punch 196 is now in its fully extended position (not shown). As ledges 199 and 210 approached each other, tube 16 was still completely trapped within the stuffing ledge cavity defined by ledges 199 and 210 and vertical walls 203 and 208. Tube 16 had nowhere to escape or to be pinched. Instead, tube 16 merely conformed to the shrinking, contoured cavity which, upon complete extension of punch 196, was defined entirely by walls 203 and 208 and ledges 199 and 210. The flexible mandrel of tube 16 created by the internal hydraulic pressure ensures uniform, non-buckling deformation of tube 16 according to the shape of ledges 199 and 210.

After punch 196 has been completely extended, preformed tube 16 has been formed into finally formed frame member 25, except in those areas where the cross-sectional perimeter of the mutually cooperating ledges 199 and 210 is greater than the corresponding cross-sectional perimeter of tube 16. To complete the forming process as to these areas after punch 196 has been fully extended, punch 196 dwells while intensifier 225 is activated. An appropriate hydraulic valve isolates the path from port 240, through the high-pressure relief valve (not shown) and to ports 222. Actuation of intensifier 225 provides a pressure in excess of 9600 p.s.i. at port 240, and, with the high pressure relief valve serially connected between port 240 and ports 222, no more than the desired 9600 p.s.i. is applied to the interior of tube 16. Being well above the burst pressure of tube 16, tube 16 expands to conform to the cavity defined by mutually cooperating ledges 199 and 210. The desired boosted pressure ($P_{boost}$) of 9600 p.s.i. of the present embodiment is determined by whatever minimum radius (r) is defined in cross-section of the finally formed frame member and is given approximately by $P_{boost}=(2 \times th \times TS)/(2 \times r)$ where th=the wall thickness of tube 16 and TS=the tensile strength of tube 16.

It is also noted that seal 220 need not be able to withstand the 9600 p.s.i. boost pressure. At some point above the burst pressure (about 2880 p.s.i.) tube 16 will expand between seal 220 and leading edge 221 of tool 218, several thousandths of an inch until contacting and creating a mechanical seal thereat with tool 218. After completion of the pressure boosting, cylinder 226 is reversed, retracting piston 229 and relieving the boosted pressure within tube 16. Appropriate valve means (not shown) then vent the remaining pressure in tube 16 to bath 193. The inherent springback in the metal will cause a reduction of the outside diameter of end 170, thereby breaking the mechanical seal and allowing tool 218 to retract from end 170 uninhibited. Tools 218 are then retracted, and die 196 is rammed up to its retracted position. Shuttle 14 translates from its idle position (where lift mechanism 23 rests midway between stations III and IV) to its rearward position (where lift mechanism 23 is positioned over station III). Lift mechanism 23 then rams down, clamps finally formed frame member 25 and rams up, lifting it out of tub 190. Shuttle 14 then translates to its forward position (where lift mechanism 23 is positioned over end cropping and ejection station IV). Lift mechanism 23 releases frame member 25 where the unformed ends 29 (about 10 inches each on each end 170) of frame member 25 are cut off, forming the finished frame member 30 which is delivered to an appropriate receiving area.

TRANSFER SYSTEM

Referring now to FIGS. 1, 2, 13 and 17, transfer system 19 of the present invention is symmetrical about the vertical plane 244 (through which centerline 18 passes). Generally, transfer system 19 includes three pairs of opposed lift mechanisms 17, 22 and 23. Lift mechanisms 17, 22 and 23 are mounted on parallel and opposing traveling beams 245. Beams 245 are rigidly connected by a pair of cross members 246 to form a rigid, horizontally reciprocating shuttle 14. A shuttle bed 247 is rigidly mounted to the bottom of each transfer beam 245. Shuttle bed 247 extends outwardly from beam 245 along the length thereof to define a pair of longitudinal tracks 248 which ride within three groups (rear 251, middle 252 and front 253) of three sets of rollers (top 255, middle 256 and bottom 257). In each roller group 251, 252 and 253, top and bottom rollers 255 and 257 are held to rotate about a horizontal axis and middle rollers 256 are held to rotate about a vertical axis by a pair of roller mounting brackets 258 which are supported by transfer bed 259. Brackets 258, rollers 255, 256 and 257 and shuttle bed 245 are all sized and arranged so that longitudinal tracks 248 rest and ride atop bottom rollers 257 in each group 251, 252 and 253; so that the outer edges of tracks 248 are in constant contact with and thereby kept in horizontal alignment by middle rollers 256 of all three groups 251, 252 and 253; and, tracks 248 are in constant contact with and are thereby kept vertically aligned by top rollers 257 of all three groups 251, 252 and 253. Shuttle 14 is horizontally translated by a shuttle drive cylinder 262 which is mounted to transfer bed 259. The piston of drive cylinder 262 is connected to shuttle bed 247 by a bracket 267.

Each lift mechanism 17, 22 and 23 is supported by a cantilevered support beam 260 which in turn is rigidly mounted to traveling beam 245. The lift mechanism 23 shown in FIG. 17 (which is representative of lift mechanisms 17 and 22) includes a transfer fixture 263 supported for vertically reciprocating movement by the piston rod 264 of a hydraulic cylinder assembly 265 which is mounted to support beam 260. A pair of guide rods 266 are fixed to fixture 263 and extend upwardly through complementary slots in support beam 260 to keep transfer fixture 263 in horizontal and rotational alignment. Transfer fixture 263 includes a hydraulic clamping cylinder assembly 269, the piston rod of which defines a clamping arm 270. Fixture 263 also defines an upper clamping surface 271.

To clamp a tube 16, for example when lift mechanism 23 is properly positioned over tub 190 of station III, cylinder assemblies 265 simultaneously lower their transfer fixtures downward until upper clamping surface 271 is just above or just touches the top of the tube 16. Clamping cylinder assemblies 269 simultaneously extend their clamping arms 270 inwardly, thereby camming tube 16 upwardly into a clamping arrangement between the opposing fixtures 263 and between clamping arm 270 and upper surface 271. Cylinders 265 then simultaneously raise their fixtures 263, and shuttle 14 is translated as desired to carry tube 16 to a desired position.

Lift mechanisms 17, 22 and 23, and traveling beams 245 and roller groups 251, 252 and 253 are sized and positioned so that when shuttle is in a rearward position (FIG. 1), lift mechanism is appropriately positioned over the work piece at station II, lift mechanism 22 is appropriately positioned over table 21, and lift mechanism 23 is appropriately positioned over the work piece at station III, and so that shuttle 14 may be translated to a forward position (not shown) whereby lift mechanism 17 occupies the position previously occupied by lift mechanism 22 over table 21, lift mechanism 22 occupies the position previously occupied by lift mechanism 23 of station III, and lift mechanism 23 is appropriately positioned at station IV. The idle position of transfer system 19 is defined by shuttle 14 being midway between the rearward and forward positions whereby lift mechanisms 22 and 23 rest on either side of press 186 in order to be clear from the path of vertically reciprocating die 196.

The period for one complete cycle of the present invention is defined by the elapsed time during which: shuttle 14 moves from its idle position to its rearward position; the transfer fixtures 263 of lift mechanisms 17, 22 and 23 drop, clamp their respective work piece and rise with that work piece; shuttle 14 translates to its forward position; transfer fixtures 263 drop, unclamp their respective work pieces and then rise back up; and, shuttle 14 returns to its idle position and rests until the various operations occur at stations I, II, III and IV, after which shuttle 14 moves from its idle position to its rearward position, beginning a new cycle. It is estimated that the period for a single cycle will be dictated by the hydroforming operation at station III and will be 29 seconds.

Also included but not shown in the present invention are a variety of sensors as appropriate to monitor the position and operation at each station. Flow dividers will be used in the hydraulic circuits wherever desired to achieve simultaneous and coinciding operation of pairs of cooperating cylinder assemblies. Proportional valves will also be employed in the hydraulic circuit to achieve variable acceleration and deceleration rates. Also, high resolution transducers will be used to control the various die, fixture and shuttle operations to ensure precision operation.

While the shape of the part formed in the present embodiment resulted in a punch and die configuration wherein the vertical walls 203 and 208, heels 204 and 209, and ledges 199 and 210 all had a particular orientation, it is noted that other orientations are possible and may, in fact be dictated by the part to be formed.

Figure 14:
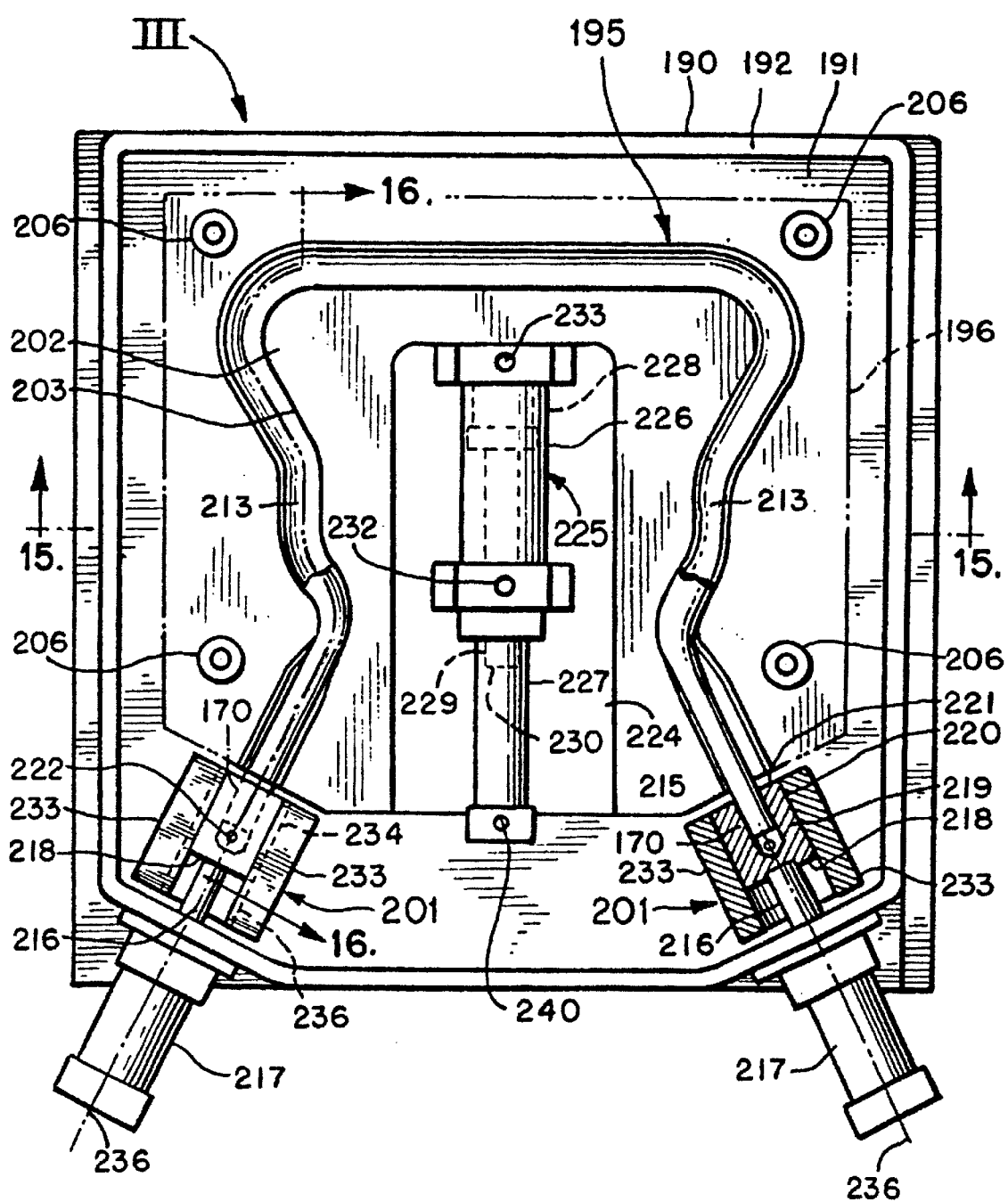
FIG. 14 a plan, partly cross-sectional view of the tub, die, and sealing units of the final hydroforming station III of FIG. 13.

Referring to FIGS. 14–16 and the operation at station III, the complete cross-sectional profile the finished frame member 30 may be formed from a preformed tube 16 by the stuffing ledge punch and die operation without the pressure boosting step. Where the part print of the desired finally formed frame member (as defined by mutually cooperating ledges 199 and 210) has one or more cross-sectional perimeters along its length which are larger (5–10%, for example) than the corresponding cross-sectional perimeter of the tube 16 yet to be formed, the tube must be expanded at those points into the desired form by boosting the internal hydraulic pressure. While this procedure may now be reliably and quickly performed by the present invention, another significant tube-forming operation may be performed by the same components of the present invention. Instead of requiring the application of high internal pressure to expand the tube into small radiused corners, the stuffing ledge and hydroforming arrangement of the present invention will form a circular cross-sectioned tube into a finally formed frame member having sharp corners during the application of the less-than-burst (about 2880 p.s.i.) internal pressure. This may be achieved where the cross-sectional perimeter of the finally formed frame member is approximately equal to that of the blank to be formed. In the stuffing ledge arrangement of station III, there are no openings between mutually cooperating die halves during the final, critical moments of tube compression within which the tube may "pinch." With the existence of the less-than-burst internal pressure, and where the cross-sectional perimeter of the stuffing ledge cavity is approximately equal to the cross-sectional perimeter of the tube to be formed, I have discovered that the tube will form into sharp corners of the stuffing ledges without the necessity of applying the high internal pressure (9600 p.s.i.). This discovery is significant because it obviates the need to provide an excessively high downward force upon punch 196 by cylinder assemblies 189 (i.e., about 15 tons) to keep punch 196 vertically in place during the 9600 p.s.i. pressure boost.

It should also be noted that walls 203 and 208 and heels 204 and 209 are vertical and that punch 196 is adapted, therefore, for vertical reciprocation. It is to be understood that non-vertical applications are also contemplated by the present invention so long as walls 203 and 208 and heels 204 and 209 and the motion of punch 196 are all in parallel planes.

In an alternative embodiment, hydraulic accumulators may be connected to ports 177 of sealing units 95 whereby, as sealing tools 99 extend inwardly and over ends 170 of tube 11, hydraulic pressure from ports 177 energize a pair of corresponding accumulators. After sealing tools 99 seal and pressurize tube 11 as previously described the stored hydraulic pressure in the accumulators is switched to feed ports 177, through an appropriate relief valve set at the desired pressure. Thus, during the tangent bend and prehydroforming operation, any pressure drop (due to leakage or increase in internal volume) will be replenished by the accumulators.

Figure 20:
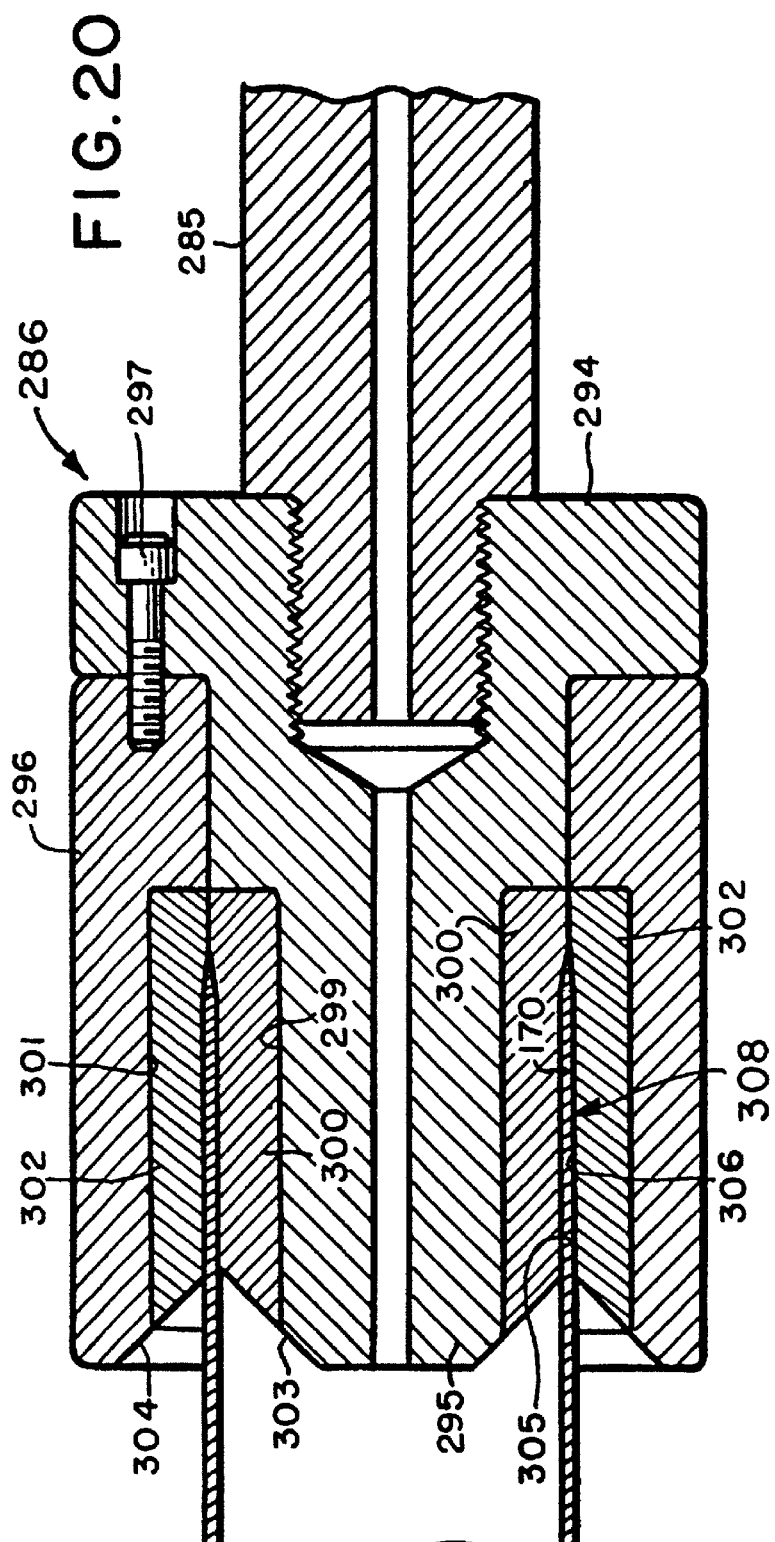
FIG. 20 is an enlarged, cross-sectional view of the combination burnishing and sealing tool of the combination burnishing and sealing unit of FIG. 19.

Referring to FIGS. 19–20, an alternative embodiment is shown wherein the burnishing units 50 of blank feeder and burnishing station I and the sealing units 95 of tangent bend and prehydroforming station II are replaced by a pair of combination burnishing and sealing units 280. As the two combination units 280 are identical, the following description will apply equally to both units. Like sealing unit 95 (FIG. 7), combination unit 280 is mounted atop the saddle plate 100 to pivot about vertical axis 111. Combination unit 280 generally includes a foot-mounted, double-end rod cylinder assembly 279 with a one-quarter inch fluid passage 288 extending from a fluid supply line 289 to a combination burnishing and sealing tool 286, mounted at the forward end of rod 285. Cylinder assembly 279 includes a forward head 281, a rear head 282, a cylinder 283 mounted therebetween, a piston 284 and a piston rod 285. Piston 284 is rigidly mounted to move as a unit with piston rod 285. Forward and return ports 291 and 292 provide pressure to the forward and rear sides of piston 284 to reciprocate piston 285 and combination tool 286.

Referring to FIG. 20, combination burnishing and sealing tool 286 includes a pilot 294 having a central post portion 295. A cylindrically-shaped outer shell 296 coaxially surrounds post portion 295 and is securely mounted to pilot 294 by appropriate screws 297. Both pilot 294 and shell 296 are made of a A-2 tool steel having a Rockwell hardness of approximately 50. Post portion 295 defines an outwardly facing, cylindrical recess 299 within which is seated by shrink fit a tungsten carbide, cylindrical, inner insert 300 having a Rockwell hardness of approximately 90. Outer shell 296 defines an inwardly facing, cylindrical recess 301 within which is seated by shrink fit a cylindrical outer insert 302 having a Rockwell hardness of approximately 90. Insert 300 along with post portion 295 and outer insert 302 along with shell 296 define sloping, annular entry surfaces 303 and 304, respectively. Entry surfaces 303 and 304 together define an annular, V-shaped groove to allow for any misalignment when combination tool 286 is extended onto the end of blank 11.

Figure 21:
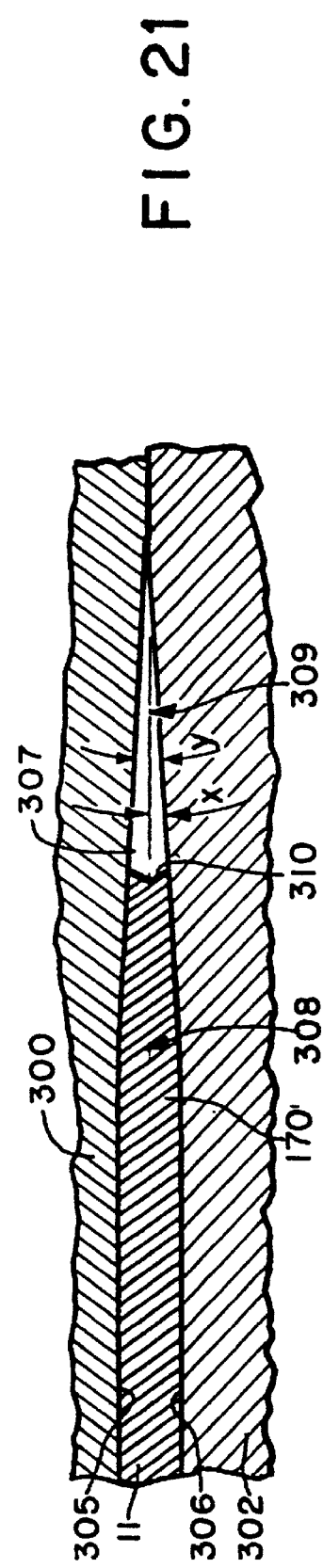
FIG. 21 is an enlarged, cross-sectional view of a portion of the combination burnishing and sealing tool of FIG. 20, showing the converging end 309 of gland 308.

Referring now to both FIGS. 20 and 21, the outer surface 305 of insert 300 is ground to produce an outer diameter equal to the inner diameter of blank 11 minus 0.005 inches clearance. The inner surface 306 of insert 302 is ground to produce an inner diameter equal to the outer diameter of blank 11 plus 0.005 inches clearance. With inserts 300 and 302 and outer shell 296 and pilot 294 completely assembled, inner and outer surfaces 305 and 306 create a cylindrical groove or "gland" 308 for sliding receipt of the end 170 of blank 11. Gland 308, in cross-section as shown in FIG. 21, is symmetrical about a line of symmetry 307. Each of surfaces 305 and 306 is ground at its inner end at an angle a approximately equal to 2°. The innermost end 309 of gland 308 thereby converges toward line of symmetry 307 at an angle of approximately 4°. In the present embodiment, the wall thickness of blank 11 is approximately 0.08 inches and the distance along line of symmetry 307 over which gland 308 tapers is approximately 0.8 inches.

Combination burnishing and sealing unit 280 operates in conjunction with tangent bend and prehydroforming station II as follows:

With blank 11 resting within bath 84, and firmly clamped by inner die 92, die block 91 and shoe 97 as described above, blank 11 is axially aligned with combination burnishing and sealing tool 286. Further, combination tool 286, like sealing tool 99 of the previous embodiment, is completely submerged within the aqueous bath, and both tool 286 and blank 11 are thus automatically filled with the aqueous solution. Cylinder assembly 279 is now actuated by forcing fluid through forward port 292, causing piston 284 and rod 285 to move to the left (in FIGS. 19–21), whereby combination tool 286 extends and telescopically surrounds end 170 of blank 11. The V-shaped, annular groove defined by sloping surfaces 303 and 304 allows for possible misalignment between distal end 170 and tool 286. Near complete extension of piston rod 285 and tool 286 will force distal end 170 of blank 11 through gland 308 and into tapering end 309. As a result, the wall of distal end 170 will be compressed or coined. (The distal end 310 will form a V-cross-section, as shown in FIG. 21.) A substantially water-tight seal will be created between end 170 and inserts 300 and 302 at the surfaces of contact within the converging end 309. With a Rockwell hardness of approximately 90 and all of surfaces 305 and 306 ground smoothly, the coefficient of friction between inserts 300 and 302 and blank 11 is very low. This will allow blank 11 to slide smoothly out of gland 308 after completion of the hydroforming process.

Combination unit 280 is dimensioned so that upon initial sealing, piston 284 is spaced a distance w from forward head 281. Distance w is the reserved forward stroke of piston 284 corresponding to the retraction of distal end 170 from within the particular sealing tool as a result of the prehydroforming operation as described and shown by positions a, b and c in FIG. 9. In other words, piston 284 will not bottom out against head 281. Rather, pressure is always provided during hydroforming, through port 292 to keep combination tool 286 and gland 308 sealed against the end of blank 11.

As with sealing unit 95, conventional pumping means (not shown) are provided to deliver aqueous solution, under pressure, to fluid supply line 289. The pumping means also includes a conventional relief valve (not shown) which is set to a desired relief pressure as described above.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. The apparatus for bending a tube blank having an outer diameter, comprising:
    an inner bending die having an arcuate outer surface which has a first radius from an axis;
    a wiper shoe having an inner surface, said shoe disposed and adapted to trap a tube blank between said inner surface and said outer surface;
    holding means for holding a first portion of the blank against said inner die;
    limiting means for limiting movement of said shoe to rolling about an arc around said axis, said arc having a second radius from said axis which is approximately between said first radius and said first radius plus said diameter; and,
    moving means for moving said shoe around said axis, and around the blank thereby bending a second portion of the blank around said outer surface;
    sealing means for sealing the blank and for hydraulically pressurizing the interior of the blank to a desired pressure while said moving means moves said shoe;
    filling means for automatically filling the tube blank with liquid prior to sealing and pressurizing the tube blank, said filling means includes a tub filled with liquid and said die, shoe, and sealing means being submerged within said liquid.

2. The apparatus for bending a tube blank of claim 1 wherein said second radius is approximately equal to said first radius.

3. The apparatus for bending a tube blank of claim 1 wherein said limiting means includes a stationary pinion coaxial with said axis and a rack rigidly connected to said shoe and tangentially engaged with said pinion.

4. The apparatus for bending a tube blank of claim 3 wherein said inner and outer surfaces each define a mutually cooperating mold cavity sized to completely enclose a portion of the blank.

5. The apparatus for bending a tube blank of claim 1 further including sealing means for sealing the blank and for hydraulically pressurizing the interior of the blank to a desired pressure while said moving means moves said shoe.

6. The apparatus for bending a tube blank of claim 5 wherein the tube blank has first and second opposing ends and wherein said sealing means includes a pair of tools having bores, said tools being adapted to telescopically extend over said ends to seal and pressurize the tube blank.

7. The apparatus for bending a tube blank of claim 5 further including filling means for automatically filling the tube blank with liquid prior to sealing and pressurizing the tube blank.

8. The apparatus for bending a tube blank, having an outer diameter, comprising:
    an inner bending die having an arcuate outer surface which has a first radius from an axis;
    a wiper shoe having an inner surface, said shoe disposed and adapted to trap a tube blank between said inner surface and said outer surface;
    holding means for holding a first portion of the blank against said inner die;
    limiting means for limiting movement of said shoe to rolling about an arc around said axis, said arc having a second radius from said axis which is approximately between said first radius and said first radius plus said diameter; and,
    moving means for moving said shoe around said axis, and around the blank thereby bending a second portion of the blank around said outer surface;
    tube blank preforming means, a portion of which revolves proportionally with said shoe around said axis, for preforming a desired profile in a third portion of the blank from the second portion of the blank.

9. The apparatus for bending a tube blank of claim 8 further including a base and wherein said moving means includes a wing mounted to said base to revolve about said axis, wherein said preforming means includes a contoured outer die mounted for reciprocal sliding movement on said wing and a cooperating, inner preforming die, said inner preforming die and said outer die adapted to close around the third portion of the blank, thereby preforming the third portion, after the blank has been bent around said outer surface.

10. The apparatus for bending a tube blank of claim 9 wherein said inner bending die and said inner preforming die are integrally connected.

11. The apparatus for bending a tube blank of claim 10 further including sealing means for sealing the blank and for hydraulically pressurizing the interior of the blank to a desired pressure while said moving means moves said shoe and while said outer die and said inner preforming die close around the third portion of the blank.

12. The apparatus for bending a tube blank of claim 11 wherein the tube blank has first and second opposing ends and wherein said sealing means includes a pair of tools having bores, said tools being adapted to telescopically extend over said ends to seal and pressurize the tube blank.

13. The apparatus for bending a tube blank of claim 12 wherein said sealing means are mounted to said wing to rotate therewith around said axis.

14. The apparatus for bending a tube blank of claim 11 further including filling means for automatically filling the tube blank with liquid prior to sealing and pressurizing the tube blank.

* * * * *